US009984167B1

(12) United States Patent
Horling et al.

(10) Patent No.: US 9,984,167 B1
(45) Date of Patent: *May 29, 2018

(54) RANKING COMMUNITIES BASED ON CONTENT

(71) Applicant: Google Inc., Mountain View, CA (US)

(72) Inventors: Bryan Christopher Horling, Sunnyvale, CA (US); Okan Kolak, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/339,533

(22) Filed: Oct. 31, 2016

Related U.S. Application Data

(63) Continuation of application No. 14/018,015, filed on Sep. 4, 2013, now Pat. No. 9,483,524.

(60) Provisional application No. 61/732,925, filed on Dec. 3, 2012.

(51) Int. Cl.
*G06F 17/30* (2006.01)

(52) U.S. Cl.
CPC .. *G06F 17/30867* (2013.01); *G06F 17/30991* (2013.01)

(58) Field of Classification Search
CPC .............. G06F 17/30867; G06F 17/30991
USPC .......................................... 707/723
See application file for complete search history.

(56) References Cited

U.S. PATENT DOCUMENTS

| | | | | |
|---|---|---|---|---|
| 7,567,970 | B2* | 7/2009 | Chung | G06F 17/30864 707/999.001 |
| 8,972,557 | B2* | 3/2015 | Lee | G06F 17/3071 709/204 |
| 2005/0256866 | A1 | 11/2005 | Lu et al. | |
| 2008/0086534 | A1* | 4/2008 | Bardak | G06Q 30/02 709/206 |
| 2008/0162265 | A1* | 7/2008 | Sundaresan | G06F 17/30867 707/781 |
| 2009/0271391 | A1* | 10/2009 | Kawale | G06F 17/30867 707/999.005 |
| 2009/0313299 | A1* | 12/2009 | Bonev | G06Q 10/109 707/999.103 |
| 2011/0022602 | A1* | 1/2011 | Luo | G06Q 10/10 707/748 |
| 2011/0022621 | A1* | 1/2011 | Luo | G06Q 30/02 707/769 |

(Continued)

*Primary Examiner* — Kris E Mackes
*Assistant Examiner* — Thuy T Bui
(74) *Attorney, Agent, or Firm* — Lowenstein Sandler LLP

(57) ABSTRACT

Systems and methods for ranking communities based on content are described. A method includes receiving a search query from a first user of a social network. The method further includes analyzing content within groups of the social network to identify one or more of the groups that have content related to the search query. Each group may include one or more posts received from one or more members of the group. The groups may be identified responsive to a content match between the search query and content of a statistical amount of members of the respected group. The method may further include ranking the identified groups for presentation of the identified groups in a ranked order on a client device in response to the search query, the ranked order of each group being based on a corresponding statistical amount of members that have posted content matching the search query.

14 Claims, 12 Drawing Sheets

(56) References Cited

U.S. PATENT DOCUMENTS

| | | | |
|---|---|---|---|
| 2012/0005224 A1* | 1/2012 | Ahrens | G06Q 10/10 707/769 |
| 2012/0136866 A1* | 5/2012 | Carter | G06Q 50/01 707/740 |
| 2012/0158715 A1* | 6/2012 | Maghoul | G06F 17/30867 707/728 |
| 2012/0158720 A1* | 6/2012 | Luan | G06F 17/30867 707/732 |
| 2012/0185472 A1* | 7/2012 | Ahmed | G06F 17/30867 707/728 |
| 2013/0325550 A1* | 12/2013 | Varghese | G06Q 30/02 705/7.31 |
| 2014/0119531 A1 | 5/2014 | Tuchman et al. | |

* cited by examiner

RANKING COMMUNITIES BASED ON CONTENT

CLAIM OF PRIORITY

This application is a continuation of U.S. Non-Provisional patent application Ser. No. 14/018,015, filed Sep. 4, 2013, entitled "Ranking Communities Based on Content", which claims the benefit of and priority of U.S. Provisional Patent Application No. 61/732,925, filed on Dec. 3, 2012, entitled "Ranking Communities Based on Content", which is hereby incorporated by reference in its entirety.

BACKGROUND

There is a large group of people in the world that like to socialize with other people. For example, some people like to find other people to discuss their problems, their successes, their losses, etc. With the advancement of the Internet, a variety of networks are generated that allow people to socialize. For example, a person may find an old friend on a social network. As another example, a person may meet someone new on the social network. However, sometimes a person may wish to talk about an issue randomly, e.g., based on how a person feels.

SUMMARY

The present disclosure relates to systems and methods for ranking communities based on content. It should be appreciated that the implementations described in the present disclosure may be implemented in numerous ways, e.g., a process, an apparatus, a system, a device or a method on a computer-readable medium.

Various implementations described in the present disclosure provide systems and methods for ranking communities based on content. For example, the systems determine whether there is a match between a term bowling and a community in which most members discuss bowling. The community in which most members discuss bowling is ranked first compared to any other community. As another example, the systems determine whether there is a match between a term cars and a community in which most members discuss about cars. The community in which most members discuss cars is ranked first compared to other communities.

In some implementations, a method includes receiving a search query. The search query is received from a first user of a social network. The method includes examining content within communities to determine whether one or more of the communities satisfy the search query. Each community is associated with the social network and includes one or more posts. The one or more posts in a community are received from one or more members of the community. The method further includes ranking the communities based on the examination of the content for presentation of the communities in a ranked order on a client device in response to the search query. The ranked order includes an arrangement of one or more of the communities with more content related to the search query in an elevated prominence compared to one or more of the communities having less content related to the search query. The method is executed by one or more processors.

These and other implementations can include one or more of the following features.

In several implementations, each community has an owner and an administrator.

In various implementations, the one or more of the communities satisfy the search query when there is a content match between the search query and content of a statistical amount of members of the one or more of the communities.

In some implementations, the operation of examining content includes examining posts within the communities, metadata associated with the posts, or a combination thereof.

In several implementations, the operation of ranking the communities is performed based on topics discussed in threads within the communities. The threads include the content.

In some implementations, the operation of ranking the communities is performed based on a number of shares of posts within the communities. The posts include the content.

In various implementations, the operation of ranking the communities is performed based on a number of posts within the communities. The posts include the content.

In some implementations, the operation of ranking the communities is performed based on interactions of members with the communities.

In several implementations, the operation of ranking the communities is performed based on a number of social network friends of the first user within the communities.

In various implementations, the operation of ranking the communities is performed based on languages used within the communities by members of the communities and a preference language of the first user. The languages are used to express the content.

In some implementations, the operation of ranking the communities is performed based on an amount of spam within the communities.

In various implementations, the operation of ranking the communities is performed based on a number of members within the communities.

In some implementations, the operation of ranking the communities is performed based on a location of the first user and locations of the communities.

In several implementations, the operation of ranking the communities is performed based on numbers of members joining the communities within a time period.

In various implementations, the operation of ranking the communities is performed based on numbers of members leaving the communities within a time period.

In several implementations, the operation of ranking the communities is performed based on numbers of members joining and leaving the communities within a time period.

In some implementations, the operation of ranking the communities is performed based on dates of creation of the communities.

In various implementations, the operation of ranking the communities is performed based on dates of interactions of members of the communities with the communities.

In several implementations, the operation of ranking the communities is performed based on ratios of numbers of posts made within the communities by members of the communities and numbers of the members.

In various implementations, the operation of ranking the communities is performed based on a weighted combination of the content occurring within the communities, a number of shares of posts within the communities, interactions of members with the communities, a number of social network friends of the first user within the communities, a match between languages used within the communities by members of the communities and a preference language of the first user, an amount of spam within the communities, a match between a location of the first user and locations of the communities, numbers of members joining the communities within a time period, numbers of members leaving the communities within the time period, numbers of members joining and leaving the communities within the time period, dates of creation of the communities, dates of interactions of members of the communities with the communities, and ratios of numbers of posts made within the communities by members of the communities and numbers of the members. The languages are used to express the content.

In some implementations, a server system is described. The server system includes one or more processors. The one or more processors are configured to receive a search query. The search query is received from a first user of a social network. The one or more processors are further configured to examine content within communities to determine whether one or more of the communities satisfy the search query. Each community is associated with the social network and includes one or more posts. The one or more posts in a community are received from one or more members of the community. The one or more processors are configured to rank the communities based on the examination of the content for presentation of the communities in a ranked order on a client device in response to the search query. The ranked order including an arrangement of one or more of the communities with more content related to the search query in an elevated prominence compared to one or more of the communities having less content related to the search query. The server system includes one or more memory devices configured to store user accounts associated with the first user and the members.

These and other implementations can include one or more of the following features.

In several implementations, each community has an owner and an administrator.

In some implementations, a non-transitory computer-readable medium encoding instructions is described. The instructions in response to execution by a computing device cause the computing device to perform operations. The operations include receiving a search query. The search query is received from a first user of a social network. The operations further include examining content within communities to determine whether one or more of the communities satisfy the search query. Each community is associated with the social network and includes one or more posts. The one or more posts in a community are received from one or more members of the community. The operations include ranking the communities based on the examination of the content for presentation of the communities in a ranked order on a client device in response to the search query. The ranked order includes an arrangement of one or more of the communities with more content related to the search query in an elevated prominence compared to one or more of the communities having less content related to the search query.

These and other implementations can include one or more of the following features.

In some implementations, each community has an owner and an administrator.

These implementations may provide one or more of the following advantages. When a user wishes to discuss an issue, the user may search for a community that is focused on the issue. The implementations provide a manner of ranking communities based on content within the communities. Such ranking allows the user to obtain access to a community in which a number of members are focused on discussing the issue.

Other aspects will become apparent from the following detailed description, taken in conjunction with the accompanying drawings.

BRIEF DESCRIPTION OF THE DRAWINGS

Various implementations of the present disclosure may best be understood by reference to the following description taken in conjunction with the accompanying drawings.

DETAILED DESCRIPTION

The following implementations describe systems and methods for ranking communities based on content within the communities.

Figure 1:
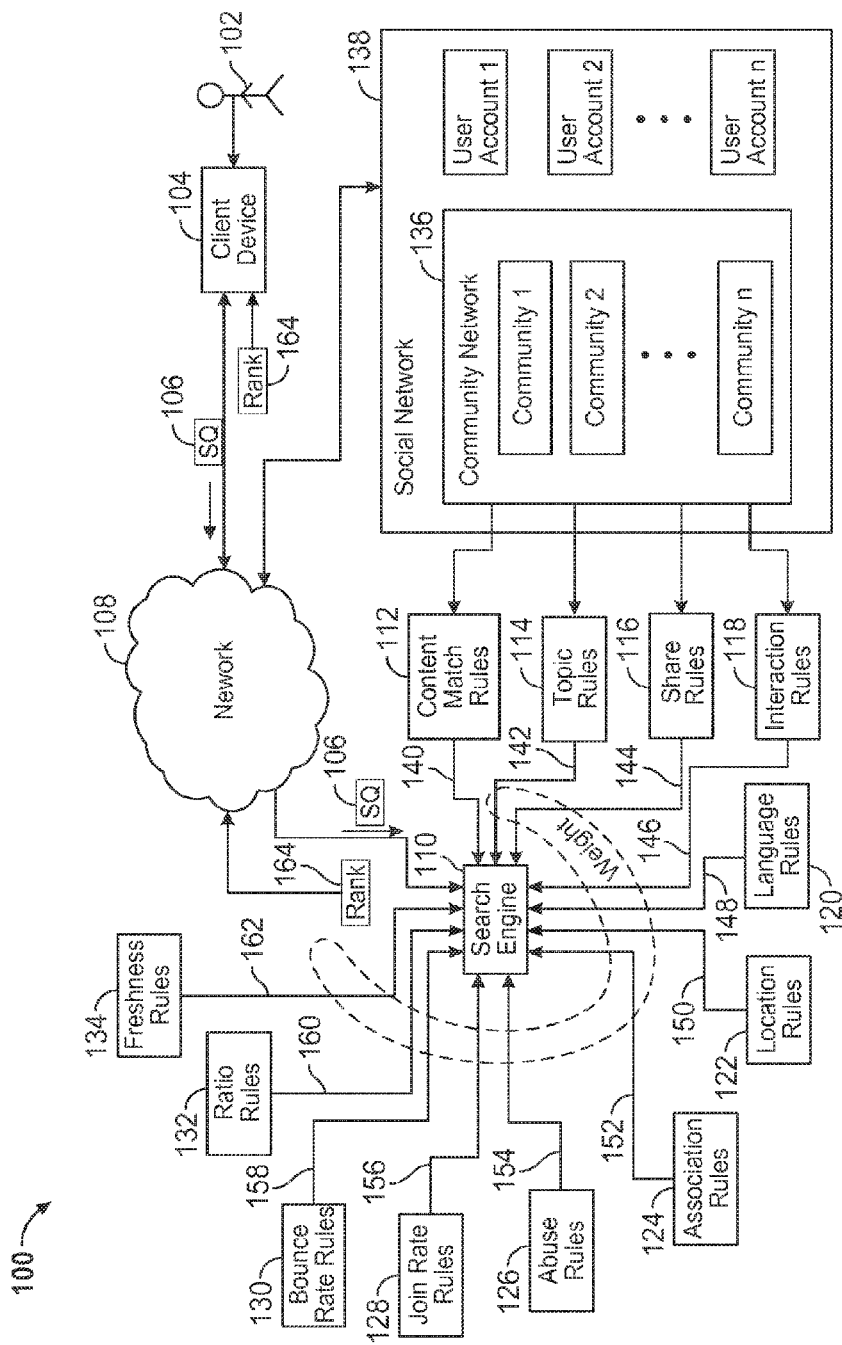
FIG. 1 is a block diagram of a system for ranking communities based on content, in accordance with various implementations of the present disclosure.

FIG. 1 is a block diagram of a system 100 for ranking communities based on content, in accordance with several implementations described in the present disclosure. A user 102 uses his/her/its client device 104 to generate and send a search query 106, which is a web search query. A search query can include search terms, e.g., including characters, letters, numbers, which can form search directives or hyperlinks, images, etc. For example, the user 102 enters the search query 106 into a search engine 110, which is a web search engine, to obtain information via the World Wide Web. As another example, the user 102 enters plain text, videos, images, animations, and/or hypertext, via an input device of the client device 104. As yet another example, the user 102 enters plain text, videos, images, animations, and/or hypertext, and/or optional search-directives, e.g., and, or, etc., via the input device of the client device 104. Examples of a client device include a smart phone, a desktop computer, a laptop computer, and a tablet. Examples of an input device are provided below.

The search query 106 is sent via a network 108 to be received by the search engine 110. The search engine 110 is executed by one or more processors. For example, the search engine 110 is executed by one or more processors of one or more servers, which are described below. Examples of a processor include an application specific integrated circuit (ASIC), a programmable logic device (PLD), a microprocessor, a central processing unit (CPU), etc. An example of the server is provided below. Examples of the network 108 include a wired network, a combination of a wireless network and a wired network, a local area network (LAN), a wide area network (WAN), a combination of WAN and a LAN, the Internet, an Intranet, and a combination of the Internet and an Intranet.

The search engine 110 receives the search query 106 and applies one or more rules, e.g., content match rules 112, topic rules 114, share rules 116, interaction rules 118, language rules 120, location rules 122, association rules 124, abuse rules 126, join rate rules 128, bounce rate rules 130, ratio rules 132, freshness rules 134, a combination thereof, etc., to mine a community network 136, which is a database of community accounts. As an example, the search engine 110 accesses real-time information from web pages by running a web crawler computer program, which is stored in one or more memory devices coupled to the one or more servers. Examples of a memory device include a read-only memory (ROM) device, a random access memory (RAM) device, or a combination thereof. A memory device may be a Flash memory, a redundant array of disks (RAID), etc.

Communities 1 thru M of the community network 136 are community accounts, which are web accounts stored in one or more memory devices coupled to the one or more servers, where M is an integer greater than zero. Each community 1 thru M is created by one or more owners of the community and may be transferred from the owners to one or more administrators of the community. For example, an entity or a person may create a community. In this example, when the entity or the person is unwilling to be the owner, the owner transfers administration of the community to the administrator. The community network 136 is stored within one or more memory devices that are accessed by the one or more servers. In a number of implementations, the community network 136 includes a computer program that allows creation, management, and/or deletion, of the communities 1 thru M. In these implementations, the community network 136 is executed by one or more processors of the one or more servers.

In some implementations, a community is identified with a community identification (ID) that is assigned by one or more processors of the one or more servers once the community is created. In various implementations, a community includes one or more posts, e.g., posts of texts, posts of videos, posts of images, posts of multimedia, posts of animations, etc.

In some implementations, a community can be administered through use of access control lists. When a user, e.g. an entity, a person, etc., joins a community, the user becomes a member of the community and may participate in conversations, e.g., posts, conversation threads, comments to posts, uploads of videos, uploads of images, uploads of animations, etc., within the communities. In some implementations, a conversation thread includes a post, an indication of likeness of the post, a comment to the post, an indication of likeness of the comment, etc. In a number of implementations, an upload of videos, images, animations, etc. is part of a post or a comment.

A membership to a community may be dependent on permission to join the community from the owner or administrator of the community, may be based on an invitation to join the community from the owner or administrator, or may be open to all users. For example, a user requests the owner or administrator to join a community. The owner or administrator checks a profile, e.g., a social network profile, of the user to decide whether to allow the user to join. As another example, the owner or administrator performs a check on a profile of a user to determine whether the profile is authentic. Upon determining that the profile is authentic, the owner or administrator sends an invitation to the user via the community network 136 to become a member of the community. When the user accepts the invitation, the user becomes the member.

In a number of implementations, a user that is not a member of a community has limited interaction, e.g., is not allowed to interact, etc. with the community. For example, a user that is a non-member of a community is not allowed to post to the community, is not allowed to provide comments to posts within the community, cannot access information identifying members of the community, cannot search for information within the community, cannot upload videos, images, animations, etc. to the community, a combination thereof, etc.

In some implementations, the owner or administrator may remove membership of one or more users. For example, upon determining that one or more users are abusing a community, the owner of administrator cancels memberships of the one or more users. Upon cancelation of membership, the one or more users have limited interaction with the community. In various implementations, a user is a user account, which is described below.

In some implementations, each community can be created by one or more members of the community and each member is a user of a social network 138. For example, a community may be created by an owner. Moreover, in several implementations, ownership of a community may be transferred from an owner to a member of the community that may be designated or assigned to be an administrator. In some implementations, one or more users join a community to become members of the community. For example, one or more users of the social network 138 are invited by an owner or an administrator of a community to join the community. As another example, one or more users may request an owner or an administrator of a community to join the community. In various implementations, a member of a community accesses posts, comments, uploads, etc. posted by other members of the community. In some implementations, the members of a community, because they are members of the community, can access the various posts, comments, videos, animations, images, multimedia, etc., posted by other members without a need to obtain permission from the other members. In a variety of implementations, a member of a community can access information identifying one or more other members of the community.

In some implementations, posts, comments, uploads, etc., within a private community is accessible to an owner of the community, an administrator of the community, and to a member of the community. In various implementations, posts, comments, uploads, etc., within a public community may be accessible to all users of the social network 138.

In various implementations, a social group is created by a user of the social network 138 and the user selects other users that may be within his/her/its social network to join the social group. For example, a user creates a name of a social group and selects and drags, via an input device of a client device, information identifying other users to include the other users as members of the social group. In several implementations, a first user of the social network 138 can add a second user of the social network 138 to a social group created by the first user without a need to obtain permission from the second user and/or without receiving an invitation from the second user to join the social group. In some implementations, a first user of a social group cannot access posts, uploads, comments, etc., posted by a second user of the social group, which is created by the second user. In various implementations, a user of a social group cannot post to the social group that is created by another user, who created the social group. In some implementations, a user of a social group can comment on a post created within the social group by another user, who has created the social group. In a variety of implementations, a user of a social group cannot access information identifying one or more other users of the social group.

By comparison, a community provides access to posts, comments, uploads, etc. to all members of the community. A social group provides limited or no access to posts, comments, uploads, etc. posted by a creator of the social group to users that join the social group. Moreover, a user can join a community after obtaining permission from an owner or an administrator or after requesting the owner or administrator to allow joining the community. A creator of a social group can add a user to the social group without obtaining permission from the user.

Each community 1 thru M is a part of the social network 138, which includes one or more user accounts. In several implementations, a social network is provided upon execution of a social network service, which is an online service, online platform, or a web site that focuses on facilitating building of social relations among users. A social network service provides features via a web browser to allow users to stay in touch with each other. For example, a social network service provides a website for a user to post multimedia, receive multimedia from another user, share information with other users, chat with other users, search for other users, and/or categorize users as family, friends, acquaintances, etc.

The social network 138 includes a number of user accounts 1 thru N, where N is an integer greater than zero. A user account is a web account that allows a user to communicate via the World Wide Web with other users. For example, a user posts information, e.g., text, animation, videos, images, multimedia, etc. within a user account for other users to access the information. As another example, a user indicates within his/her/its user account that he/she/it liked a post, a comment to a post, etc. In some implementations, a comment to a post is a post.

The social network 138 is stored in one or more memory devices of the one or more servers. In a number of implementations, the social network 138 includes a computer program that allows creation, management, and/or deletion, of the user accounts 1 thru N. In these implementations, the social network 138 is executed by one or more processors of the one or more servers.

One or more processors of the one or more servers apply the content match rules 112 to provide scores to one or more of the communities 1 thru M. For example, it is determined whether there is a match between content within the search query 106 and information identifying one or more of the communities 1 thru M to generate a rank 140. Upon determining that there is content match between the search query 106 and information identifying the communities 1 and 2 and lack of content match between the information identifying the communities 3 thru M and the search query 106, the communities 1 and 2 are provided a higher score than that provided to the communities 3 thru M. When the communities 1 and 2 are provided the higher scores, the communities are ranked as being more relevant than the communities 3 thru M. As another example, the content match rules 112 are rules applied by a search engine to generate search results. Examples of the search query 106 include a query that includes search terms "pop music", a query that includes a term "shoes", a query that includes search terms "pop artist", a query that includes search terms "pop star", etc.

The one or more processors of the one or more servers apply the topic rules 114 based on topics discussed, e.g., conversed, etc., within one or more of the communities 1 thru M to generate a rank 142. For example, a determination is made whether a first number of conversations within the community 1 including search terms "pop artist" is higher compared to a second number of conversations within the community 2 also including the terms "pop artist".

A number of conversations including search terms within a community includes a number of user names of members discussing the terms within the community, a number of posts including the terms within the community, a number of comments including the terms within the community, a number of conversation threads including the terms within the community, a number of videos including the terms uploaded to the community, a number of animations including the terms uploaded to the community, a number of indications of likes of the terms within the community, a combination thereof, e.g., a sum thereof, etc. It should be noted that in some implementations, a number of user names of users that are members of a community is the same as a number of the members. In some implementations, a conversation thread includes a post, an indication of likeness of the post, a comment to the post, an indication of likeness of the comment, etc. In a number of implementations, an upload of videos, images, animations, etc. is part of a post or a comment.

As another example of application of the topic rules 114, it is determined whether a first number of posts including the search terms "pop artist" made within the community 1 is greater than a second number of posts also including the terms "pop artist" made within the community 2. Upon determining that the first number of posts is greater than the second number of posts, the community 1 is ranked as being more relevant than the community 2. Upon determining that the first number is greater than the second number, the community 1 is ranked as being more relevant than the community 2. As yet another example, it is determined whether a first number of members discussing the terms "pop artist" within the community 1 is greater than a second number of members discussing the terms "pop artist" within the community 2. Upon determining that the first number of members is greater than the second number of members, it is determined that the community 1 be ranked as being more relevant than the community 2.

It should be noted that the conversations within a community are stored within the community, which is a database within one or more memory devices of the one or more servers.

Moreover, it should be noted that although pop artist communities are provided as an example herein in the present disclosure, any other types of communities associated with a product, service, person, or emotion, e.g., soccer player communities, music communities, cooking communities, basketball player communities, sports communities, violin communities, baseball communities, golf club communities, like communities, friend communities, dislike communities, etc., may be used.

One or more processors of the one or more servers apply the share rules 116 to generate a rank 144. For example, it is determined whether a first number of times for which a post, a comment, an upload, an indication of likeness, a combination thereof, etc., that includes the search terms "pop artist" is shared with members of the community 1 is greater than a second number of times for which a post, a comment, an upload, an indication of likeness, a combination thereof, etc., that also includes the terms "pop artist" is shared with members of the community 2. Upon determining that the first number of times is greater than the second number of times, it is determined that the community 1 is ranked as being more relevant than the community 2.

One or more processors of the one or more servers apply the interaction rules 118 to generate a rank 146. The interaction rules 118 determine a level of interaction of a member of a community with the community. Examples of the level of interaction include a quantity of interaction, a quality of interaction, or a combination thereof. The quantity of interaction of a member with a community is determined based on a number of posts including search terms within the community by the member, a number of times the posts are shared by the member with the community, a number of times the posts are indicated as liked by the member, or a combination thereof. For example, upon determining that a member A of the community 1 has posted more posts that include the search terms "pop artist" within the community 1 than a number of posts including the terms posted by a member B of the community 2 within the community 2, the community 1 is ranked as being more relevant than the community 2. As another example, upon determining that the member A has posted a higher number of comments including the search terms "pop artist" within the community 1 than a number of comments including the terms posted by the member B within the community 2, it is determined that the community 1 be ranked as being more relevant than the community 2.

The quality of interaction of a member with a community is determined based on whether the member is reading posts including search terms within the community, writing posts including search terms to the community, sharing the posts including the terms, commenting on the posts including the terms, indicating likeness towards to the posts including the terms, or a combination thereof. For example, upon determining that the member A uploads posts including search terms "cool song" to the community 1 and the member B reads posts, comments, etc., including the terms from the community B, it is determined that the community 1 be ranked as being more relevant than the community 2. As another example, upon determining that the member A uploads posts including search terms "hot car" to the community 1 and the member B indicates likeness towards posts including the terms within the community 2, the community 1 is ranked as being more relevant than the community 2.

In several implementations, an act of writing posts or an act of commenting to a post takes more effort than an act of sharing a post or an act of indicating likeness towards a post. A community that includes more acts of writing posts and/or commenting on posts compared to acts of sharing posts and/or indicating likeness towards posts has a higher quality of interaction between members of the community. The community has the higher quality of interaction than a community that includes more acts of sharing posts and/or indicating likeness towards posts than acts of writing posts and/or commenting on posts.

As an illustration of application of the interaction rules 118, it is determined whether a level of interaction of the member A with the community 1 is higher than a level of interaction of the member B with the community 2. Upon determining that the level of interaction of the member A with the community 1 is higher than the level of interaction of the member B with the community 2, the community 1 is ranked as being more relevant than the community 2 to generate a rank.

One or more processors of the one or more servers apply the language rules 120 to generate a rank 148. For example, the user 102 indicates, via the input device of the client device 104, one or more preferred languages of the user 102. Examples of languages include English, Spanish, Chinese, Hindi, German, French, etc. The one or more preferred languages may be stored as part of a profile of the user 102. The profile is maintained within the social network 138. Moreover, in the example, it is determined whether a statistical amount of members of the community 1 converse regarding search terms in a first set of one or more languages in the community 1 and whether a statistical amount of members of the community 2 converse regarding the terms in a second set of one or more languages in the community 2. Examples of a statistical amount, as used herein, include a majority, total number, etc. It should further be noted that in some implementations, instead of determining one or more languages based on conversations of members within a community, the members provide an indication of use of the one or more languages to the community network 138 via input devices of their corresponding client devices. In various implementations, instead of determining one or more languages based on conversations of members within a community, one or more languages used by members of the community are indicated within social network profiles of the members. Upon determining that there is a match between the one or more preferred languages and the one or more languages of the first set and that there is a mismatch between the one or more preferred languages and the one or more languages of the second set, it is determined that the community 1 be ranked as being more relevant than the community 2.

One or more processors of the one or more servers apply the location rules 122 to generate a rank 150. As an example, the location rules 120 determine a location of the user 102 and locations of a statistical amount of members of the communities 1 and 2. Upon determining that the location of the user 102 matches the locations of the statistical amount of members of the community 1 and does not match the locations of the statistical amount of members of the community 2, it is determined that the community 1 be ranked as being more relevant than the community 2. It should be noted that in some implementations, a location of a statistical amount of members of a community is a location of the community.

It should be noted that location of the user 102 may be obtained based on a location of the client device 104. For example, the client device 104 includes a global positioning system (GPS) transceiver that is used to determine a location of the client device 104. In some implementations, the user 102 provides his/her/its location within a profile that is maintained within the social network 138.

Moreover, it should be noted that locations of a statistical amount of members within a community is determined based on locations of client devices that are operated by the members. In various implementations, locations of a statistical amount of members within a community is determined based on locations provided within profiles of the members that are maintained within the social network 138. In some implementations, a location of a statistical amount of members within a community is obtained from metadata about the community. In several implementation, an owner selects via an input device of a client device one or more locations of a community that is created by the owner. In some implementations, an administrator selects via an input device of a client device one or more locations of a community that is transferred to the administrator. One or more processors of the one or more servers apply the association rules 124 to generate a rank 152. For example, it is determined whether the community 1 includes a higher number of social network friends of the user 102 that that included within the community 2. Upon determining that the community 1 includes the higher number of social network friends of the user 102, the community 1 is ranked as being more relevant than the community 2.

One or more processors of the one or more servers apply the abuse rules 126 to generate a rank 154. For example, it is determined whether the community 2 is associated with spam that includes search terms and the community 1 is not associated with spam. For example, it is determined whether a community includes spam. To determine whether a community includes spam that includes search terms, a number of keywords used within the community, within a title of the community, within a combination thereof, etc. are determined. The keywords may be used within a title of a community, a brief description of the community, metadata of the community, conversations occurring within the community, a combination thereof, etc. As an example, to determine whether a community is associated with spam, it is determined whether the community is created by an owner that is associated with spam and/or has members that are associated with spam. To determine whether a user, e.g., a member, an owner, an administrator, etc. is associated with spam, it is determined whether the user is involved in creating spam in communities, on the World Wide Web, in electronic messages, in user accounts, etc. In some implementations, it is determined whether information identifying the user, e.g., user name, electronic message address, metadata of the user, social network profile of the user, etc. is used to create spam, e.g., send electronic message with spam, etc. Upon determining that the information identifying the user is used to create spam, it is determined that the user is associated with spam. Upon determining that the community 2 is associated with spam including the search terms and the community 1 is not, the community 1 is ranked as being more relevant than the community 2. In several implementations, keywords include search terms.

As another example, it is determined whether a malware that includes search terms is associated with a community to generate the rank 154. As yet another example, it is determined whether a combination of spam and malware, both including search terms, is associated with a community to determine whether to generate the rank 154. In several implementations, it is determined whether the community 2 includes a higher amount of spam including search terms than that included within the community 1 to generate the rank 154. An amount of spam is determined by a number of keywords used within the community, a title of the community, a combination thereof, etc.

One or more processor of the one or more servers apply the join rate rules 128 to generate a rank 156. For example, it is determined whether a higher number of members of community 1 joined the community 1 within a pre-determined time period than a number of members of community 2 that joined the community 2 within the pre-determined time period. Upon determining that the higher number of members of community 1 joined the community 1 within the pre-determined time period, the community 1 is ranked as being more relevant than the community 2.

It should be noted that in several implementations, a user may get an invitation via the community network 138 from an owner or an administrator of a community to join the community and may reject the invitation to join the community. For example, the owner of administrator may select an invite button displayed on a client device to invite to user to join one of the communities 1 thru M. The user rejects the invitation by selecting a decline button, e.g., reject button, etc., via an input device of a client device to indicate rejection of the invitation to join one of the communities 1 thru M. In some implementations, an owner or administrator may get a request to join a community via the community network 138 from a user and the owner or administrator may reject the request to join the community. Rejections of invitations within a community and/or rejections of requests to join the community reduces a rate at which users join the community.

One or more processors of the one or more servers apply the bounce rate rules 130 to generate a rank 158. For example, it is determined whether a higher number of members of community 2 left the community 2 within a pre-determined time period than a number of members of community 1 that left the community 1 within the pre-determined time period. Upon determining that the higher number of members of community 2 left the community 2 within the pre-determined time period, the community 1 is ranked as being more relevant than the community 2. A member leaves a community when the member deletes his/her/its user account within the social network 138, when the member indicates to the community network 36 via the input device of the client device 136 that the member will leave the community, etc.

As another example of application of the bounce rate rues 130, it is determined whether a higher number of members of community 2 joined and left the community 2 within a pre-determined time period than a number of members of community 1 that joined and left the community 1 within the pre-determined time period. Upon determining that the higher number of members of community 2 joined and left the community 2 within the pre-determined time period, the community 1 is ranked as being more relevant than the community 2.

One or more processors of the one or more servers apply the ratio rules 132 to generate a rank 160. For example, it is determined whether a first ratio of a number of posts, comments, uploads, a combination thereof, etc. that include search terms within the community 1 to a number of members of the community 1 is less than a second ratio of a number of posts, comments, uploads, a combination thereof, etc. that also include the search terms within the community 2 to a number of members of the community 2. Upon determining that the first ratio is less than the second ratio, the community 1 is ranked as being more relevant than the community 2.

As another example, it is determined whether a first number of members posting an amount of posts, comments, uploads, a combination thereof, etc., that include search terms within the community 1 is greater than a second number of members posting the same amount of posts, comments, uploads, a combination thereof, etc., that also include the search terms within the community 2. Upon determining that the first number is greater than the second number, the community 1 is ranked as being more relevant than the community 2.

As yet another example, a preference of the user 102 regarding whether the user likes to participate in discussions that include search terms or announcements that include the terms is determined. Usually, the community 1 in which the discussions take place has a higher first ratio of members of the community 1 to posts, comments, uploads, a combination thereof, etc. that include search terms within the community 1 compared to the community 2 in which the announcements that also include the search terms occur. The community 2 in which the announcements occur has a lower second ratio of members of the community 2 to posts, comments, uploads, a combination thereof, etc. that include search terms within the community 2. The preference of the user 102 regarding whether the user likes to participate in the discussions or the announcements is indicated by the user 102 via the input device of the client device 104 to the social network 138. For example, the preference is indicated within a profile, hobbies, etc. within a user account of the user 102. In several implementations, instead of or in addition to using the indication from the user 102 regarding his/her/its preference regarding whether the user likes to participate in discussions or announcements, the preference of the user 102 is determined based on communities that the user joined. For example, it is determined whether a pre-determined number of communities, e.g., three, four, ten, etc. that the user 102 joined in a pre-determined time window is one in which discussions or announcements take place. Upon determining that discussions take place in the communities of the pre-determined number within the pre-determined time window, it is determined that the user 102 likes to participate in discussions. On the other hand, upon determining that announcements take place in the communities of the pre-determined number within the pre-determined time window, it is determined that the user 102 likes to participate in announcements. Upon determining that the user 102 prefers the discussions that include the search terms compared to the announcements that include the terms and determining that the first ratio is higher than the second ratio, it is determined to rank the community 1 higher than the community 2.

One or more processors of the one or more servers apply the freshness rules 134 to generate a rank 162. For example, it is determined whether the community 1 that includes search terms is created after the community 2 that includes the terms. Upon determining that the community 1 is created after the community 2, the community 1 is ranked as being more relevant than the community 2. In several implementations, upon determining that the community 1 is created before the community 2, the community 2 may be ranked as being more relevant than the community 1 based on a topic of the communities 1 and 2. For example, upon determining that both communities 1 and 2 are associated with a topic 1, e.g., subject 1, etc., and upon determining that the community 1 is created before the community 2, the community 1 is ranked as being more relevant than the community 2. As another example, upon determining that both communities 1 and 2 are associated with a topic 2, e.g., subject 2, etc., and upon determining that the community 1 is created before the community 2, the community 2 is ranked as being more relevant than the community 1. In several implementations, a determination whether a community is associated with a topic is based on content match between a search term and a topic of a community. As another example of application of the freshness rules, it is determined whether a latest post, upload, comment, indication of likeness, a combination thereof, etc. that includes search terms within the community 1 is more recent than a latest post, upload, comment, indication of likeness, a combination thereof, etc. that includes the terms within the community 2. Upon determining so, the community 1 is ranked as being more relevant than the community 2.

A weight W is applied by one or more processors of the one or more servers to the ranks 142, 144, 146, 148, 150, 152, 154, 156, 158, 160, and 162 to generate a rank 164. For example, the rank 142 is weighted higher than one or more of the ranks 144, 146, 148, 150, 152, 154, 156, 158, 160, and 162 to generate the rank 164. As another example, the ranks 142 and 144 are weighted higher than the ranks 146, 148, 150, 152, 154, 156, 158, 160, and 162 to generate the rank 164. As yet another example, one or more of the ranks 142, 144, 146, 148, 150, 152, 154, 156, 158, 160, and 162 are weighted higher than the remaining of the ranks 142, 144, 146, 148, 150, 152, 154, 156, 158, 160, and 162 to generate the rank 164. Examples of the weight W include a real number.

In some implementations, the weight W is applied to one or more of the ranks 142, 144, 146, 148, 150, 152, 154, 156, 158, 160, and 162 to generate an intermediate rank. One or more processors of the one or more servers apply a set of privacy rules and/or social network profile rules to the intermediate rank to generate the rank 164. As an example, it is determined based on a social network profile of a user whether the user is of a legal age for accessing communities including adult content, which is included in search terms. Upon determining that the user of not of the legal age, any communities that include adult content are excluded from the intermediate rank and are not ranked in the rank 164. As another example, when a community is designated as private by a creator or an administrator of the community, although the community is ranked after applying one or more of the rules 112, 114, 116, 118, 120, 122, 124, 126, 128, 130, 132, and 134, the community is not ranked in a list. The private community is excluded from being ranked within the rank 164. A community is designated as private via an input device of a client device during creation of the community via the input device.

In several implementations, a community that is designated as private is not ranked by one or more processors of the one or more servers. In various implementations, regardless of whether a community is private, when a user creating the search query 106 has created the private community, the private community is ranked within the rank 164 and is displayed to the user. In some implementations, in addition to a user who creates a private community, the private community is displayed as ranked within the rank 164 to any user who is given permission by an administrator or owner of the community and who has joined the community.

One or more processors of the one or more servers send the rank 164 via the network 108 to the client device 104. The rank 164 is displayed as a search result on the client device 104 to the user 102. The user 102 may decide to select one of the communities 1 thru M that is ranked first.

It should be noted that in several implementations, one or more of the rules 112, 114, 116, 118, 120, 122, 124, 126, 128, 130, 132, and 134 are applied simultaneously with, after, or before applying the remaining of the rules 112, 114, 116, 118, 120, 122, 124, 126, 128, 130, 132, and 134 to generate a rank.

In various implementations, two or more of the rules 112, 114, 116, 118, 120, 122, 124, 126, 128, 130, 132, and 134 are not applied to generate a rank.

In some implementations, invitation rules are applied by one or more processors of the one or more servers to generate rank. For example, the community 1 to which a statistical amount of users are invited to join by an owner or administrator is ranked as being more relevant than the community 2 to which a statistical number of users are not invited to join. As another example, a community 1 to which a user is invited to join is ranked as being more relevant than the community 2 to which the same or another user is not invited to join. It should be noted that the weight W is applied to the rank generated with the invitation rules in addition to the ranks 142, 144, 146, 148, 150, 152, 154, 156, 158, 160, and 162 to generate the rank 164. In some implementations, two or more of the invitation rules, the rules 112, the rules 114, the rules 116, the rules 120, the rules 122, the rules 124, the rules 126, the rules 128, the rules 130, the rules 132, and the rules 134 are not applied to generate the rank.

Figure 2:
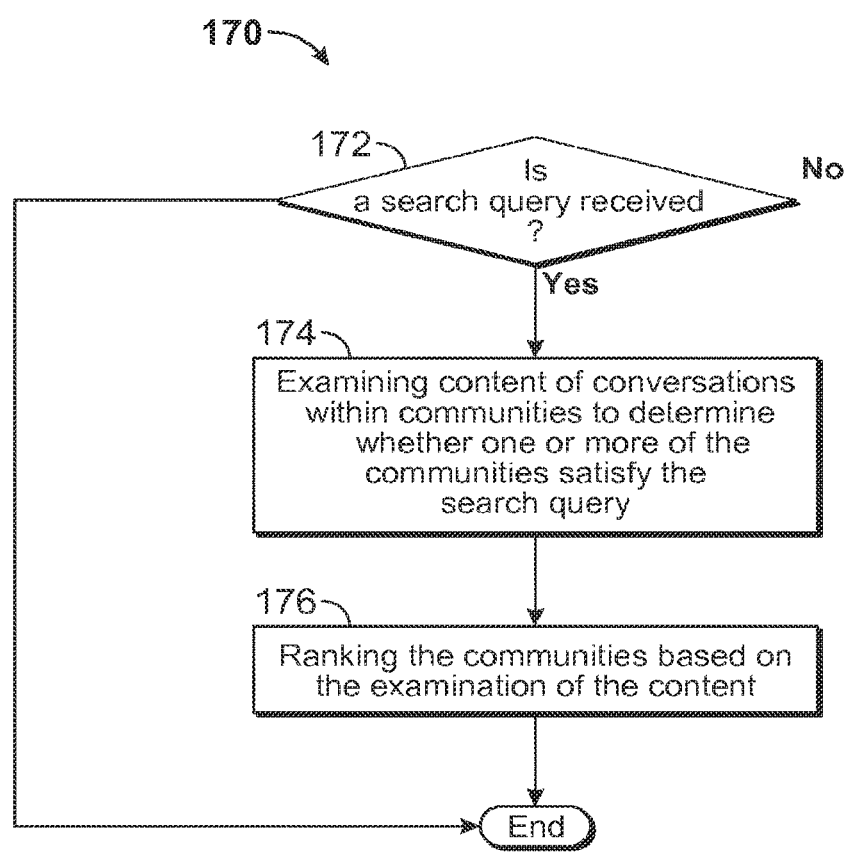
FIG. 2 is a flowchart of an embodiment of a method for ranking the communities based on the content, in accordance with several implementations of the present disclosure.

FIG. 2 is a flowchart of an embodiment of a method 170 for ranking communities based on content, in accordance with various implementations described in the present disclosure. The method 170 is executed by one or more processors of the one or more servers.

In an operation 172, it is determined whether the search query 106 (FIG. 1) is received. For example, it is determined whether one or more characters are received within a search field of the search engine 110 (FIG. 1). As another example, it is determined whether a selection of a search button of the input device of the client device 104 is received after receiving one or more characters of the search query 106. Upon determining that the search query 106 is not received, the method 170 ends.

On the other hand, upon determining that the search query 106 is received, in an operation 174, content of the communities 1 thru M is examined to determine whether one or more of the communities 1 thru M satisfy the search query. The topic rules 114 (FIG. 1) are applied to examine the communities in the operation 174. For example, a content match is performed between search terms of the search query 106 and terms used within conversations of the communities 1 thru 2. It is determined whether conversations, e.g., conversation threads, posts, comments, uploads of videos, uploads of images, uploads of animations, uploads of multimedia, uploads of audios, a combination thereof, etc. of a first statistical amount, e.g., a majority, total, etc., of members of the community 1 include the search terms of the search query 106 and conversations of a second statistical amount, e.g., a majority, total, etc., of members of the community 2 lacks the search terms of the search query 106. The first statistical amount may be the same or different than the second statistical amount. It should be noted that content of conversation of a member of a community includes content that are posted by the member within the community. In some implementations, instead of or in addition to examining content, content of metadata associated with the conversations is examined.

In several implementations, metadata of conversations includes contents and context of the conversations. For example, metadata of a conversation includes a language of the conversation, tools used to create the conversation, time of creation of the conversation, date of creation of the conversation, location on a computer network where the conversation is created, standards, e.g., technical standards, corporate standards, etc. used to create the conversation, etc.

In various implementations, instead of examining content of the communities 1 thru M, content of a pre-determined number of the communities 1 thru M is examined. For example, content of the communities 1 thru M-P is examined, where P is a positive integer less than M.

In some implementations, before examining content of the communities 1 thru M, the communities 1 thru M are filtered based on the content match rules 112 to determine communities 1 thru M-P that satisfy the content match rules. For example, the communities 1 thru M-P whose keywords, titles, etc., match search terms of the search query 106 are filtered in. Content within the communities 1 thru M-P is examined to determine whether a statistical amount of members of one or more of the communities 1 thru M-P converse using terms that match the search query 106 and whether a statistical amount of members of one or more of the remaining of the one or more of the communities 1 thru M-P do not converse using the terms. Upon determining that the statistical amount of members of one or more of the communities 1 thru M-P converse in terms that match the search query 106 and a statistical amount of members of one or more of the remaining of the one or more of the communities 1 thru M-P do not converse using the terms, the one or more of the communities 1 thru M-P are ranked as being more relevant than the remaining of the one or more of the communities 1 thru M-P.

As another example of the examination of content of conversation of the communities 1 thru M, it is determined whether a first statistical amount, e.g., majority, total, etc. of conversations, e.g., conversation threads, posts, comments, uploads of videos, uploads of images, uploads of animations, uploads of multimedia, uploads of audios, a combination thereof, etc., within the community is greater than a second statistical amount, e.g., majority, total, etc. of conversations, e.g., conversation threads, posts, comments, uploads of videos, uploads of images, uploads of animations, uploads of multimedia, uploads of audios, a combination thereof, etc., within the community 2.

In an operation 176, one or more of the communities 1 thru M are ranked based on the examination of content of the communities. For example, upon determining that conversations of the first statistical amount of members of the community 1 include the search terms of the search query 106 and conversations of the second statistical amount of members of the community 2 lack the search terms of the search query 106, the community 1 is ranked as being more relevant than the community 2. As another example, upon determining that the first statistical amount of conversations within the community 1 is greater than the second statistical amount of conversations within the community 2, the community 1 is ranked as being more relevant than the community 2.

In response to the search query 106, the rank 142 (FIG. 1) that is generated by performing the ranking of the operation 176 is sent by a network interface controller (NIC) of the one or more servers via the network 108 (FIG. 1) to the client device 104. One or more of the communities 1 thru m are displayed, e.g., presented, in a ranked order by a graphical processing unit (GPU) of the client device 102. The ranked order includes an arrangement of one or more of the communities 1 thru M with more content related to the search query in an elevated prominence compared to one or more of the communities 1 thru M having less content related to the search query. For example, the community 1 is displayed above the community 2. As another example, an image representing the community is displayed larger than an image representing the community 2. The method 170 ends after the operation 176.

Figure 3A:
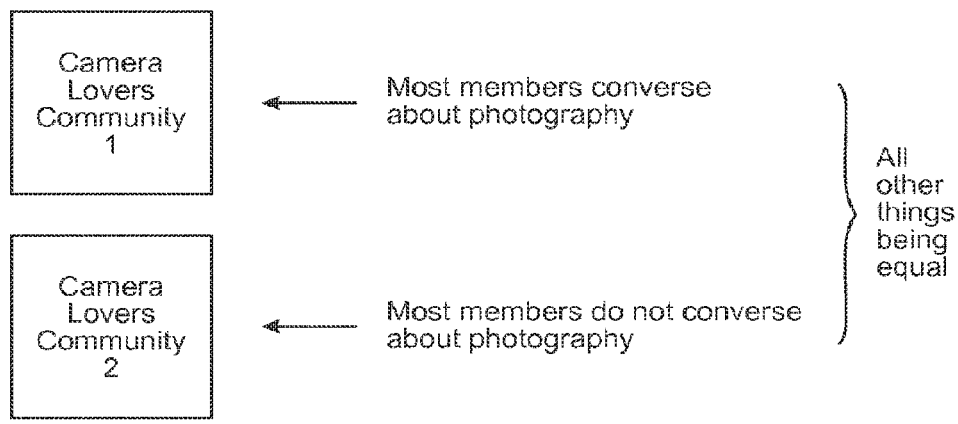
FIG. 3A is a diagram used to illustrate an application of topic rules for ranking the communities, in accordance with various implementations of the present disclosure.

FIG. 3A is a diagram used to illustrate an application of the topic rules 114 (FIG. 1), in accordance with several implementations described in the present disclosure. A first statistical amount, e.g., a majority, of members of a camera lovers community 1 converse about photography in the camera lovers community 1 and a second statistical amount of members of a camera lovers community 2 do not converse about photography in the camera lovers community 2. It should be noted that the second statistical amount may the same or different than the first statistical amount. All other things being equal, the camera lovers community 1 is ranked as being more relevant than the camera lovers community 2. It should be noted that in some implementations, as shown in FIG. 3A, all other things being equal means that application of the rules 116, 118, 120, 122, 124, 126, 128, 130, 132, and 134 (FIG. 1), all of which include rules other than the topic rules 114, results in the same rank of the camera lovers communities 1 and 2.

It should further be noted that instead of camera or love, any other area of product, service, or emotion, e.g., tennis game, coffee, botany, hate, zoology, cancer, cold symptoms, etc., may be used.

Figure 3B:
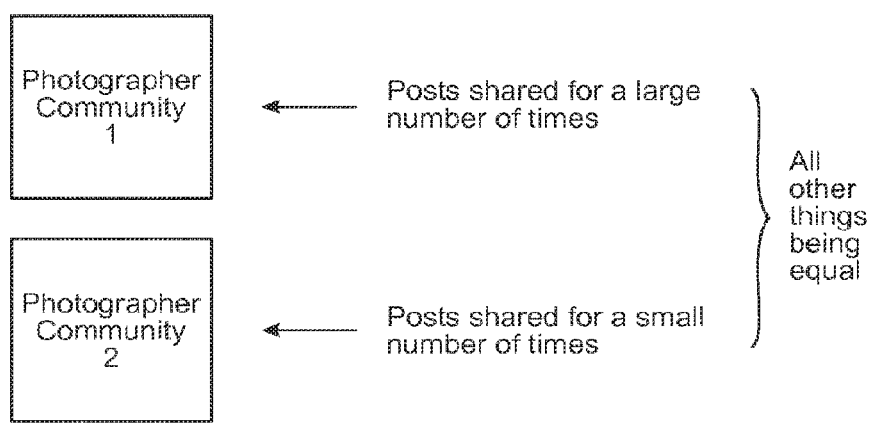
FIG. 3B is a diagram used to illustrate an application of share rules for ranking the communities, in accordance with several implementations of the present disclosure.

FIG. 3B is a diagram used to illustrate an application of the share rules 116 (FIG. 1), in accordance with some implementations described in the present disclosure. In a photography community 1, posts are shared for a higher number of times than a number of times for which posts are shared in the community 2. The photography communities 1 and 2 may be results of application of the topic rules 114. In several implementations, the photography communities 1 and 2 are generated simultaneous with or before applying the topic rules 114. All other things being equal, the photography community 1 is ranked as being more relevant than the photography community 2. It should be noted that in various implementations, all other things being equal as shown in FIG. 3B means that application of the rules 114, 118, 120, 122, 124, 126, 128, 130, 132, and 134 (FIG. 1), all of which include rules other than the share rules 116, results in the same rank of the photography communities 1 and 2.

It should also be noted that instead of photography, any other product, service, or emotion, e.g., volleyball, financial service, legal service, badminton, birdie, tennis ball, volleyball game, etc. may be illustrated.

Figure 3C:
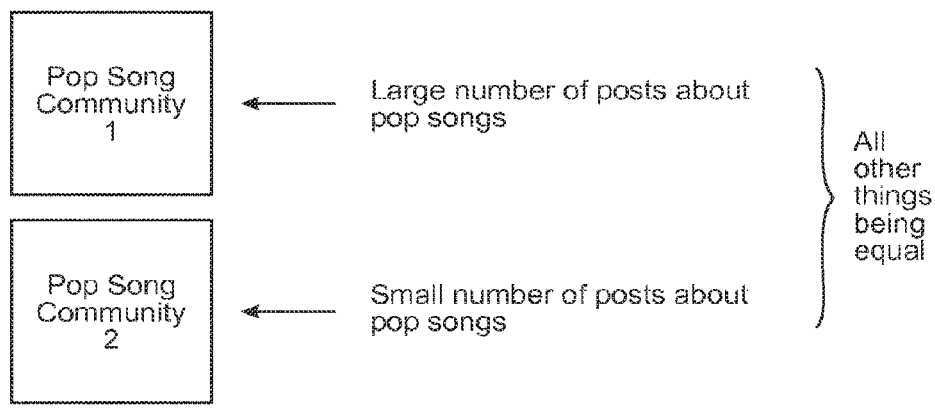
FIG. 3C is a diagram used to illustrate another application of the topic rules, in accordance with various implementations of the disclosure.

FIG. 3C is a diagram used to illustrate another application of the topic rules 114, in accordance with several implementations described in the present disclosure. In a pop song community 1, there is a greater number of posts about pop songs than a number of posts about pop songs within a pop song community 2. In some implementations, instead of a number of posts, a number of comments to posts, a number of times a post or a comment is indicated as liked, a combination thereof, etc., is used. All other things being equal, the pop song community 1 is ranked as being more relevant than the pop song community 2. It should be noted that in various implementations, all other things are equal as shown in FIG. 3C means that application of the rules 116, 118, 120, 122, 124, 126, 128, 130, 132, and 134 (FIG. 1), all of which include rules other than the topic rules 114, results in the same rank of the pop song communities 1 and 2.

It should also be noted that instead of pop songs, any other product, service, emotion, or any other topic around which users might wish to form a community, e.g., cars, trucks, mechanics, fighter jets, etc. may be illustrated.

Figure 3D:
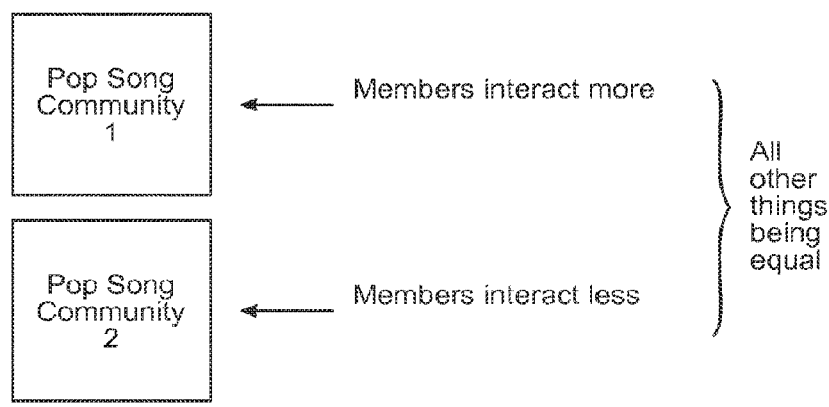
FIG. 3D is a diagram used to illustrate another application of interaction rules for ranking the communities, in accordance with several implementations of the disclosure.

FIG. 3D is a diagram used to illustrate an application of the interaction rules 118 (FIG. 1), in accordance with various implementations described in the present disclosure. Members of the pop song community 1 interact more with the pop song community 1 than an amount, e.g., quantity, etc., of interaction of members of the pop song community 2 with the pop song community 2. In some implementations, instead of the quantity of interaction, a quality of interaction or a level of interaction is used. All other things being equal, the pop song community 1 is ranked as being more relevant than the pop song community 2. It should be noted that in some implementations, all other things are equal as shown in FIG. 3D means that application of the rules 114, 116, 120, 122, 124, 126, 128, 130, 132, and 134 (FIG. 1), all of which include rules other than the interaction rules 118, results in the same rank of the pop song communities 1 and 2.

Figure 3E:
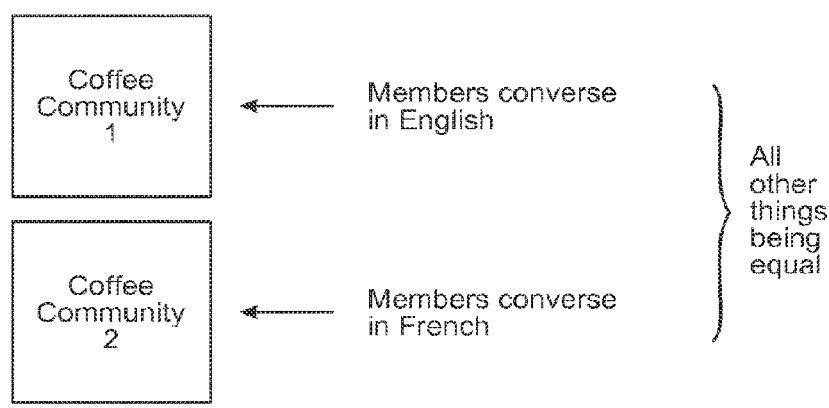
FIG. 3E is a diagram used to illustrate an application of language rules for ranking the communities, in accordance with various implementations of the present disclosure.

FIG. 3E is a diagram used to illustrate an application of the language rules 120 (FIG. 1), in accordance with some implementations described in the present disclosure. A statistical amount of members of a coffee community 1 converse, e.g., post, post comments, upload videos, images, multimedia, animations, audios, etc., in English within the coffee community 1 and a statistical amount of members a coffee community 2 discuss in French within the coffee community 2. It should be noted that the coffee communities 1 and 2 are results of application of the topic rules 114. In several implementations, the coffee communities 1 and 2 are generated simultaneous with or before applying the topic rules 114. All other things being equal, the coffee community 1 is ranked as being more relevant than the coffee community 2 when the user 102's preferred language is English. It should be noted that in various implementations, all other things are equal as shown in FIG. 3E means that application of the rules 114, 116, 118, 122, 124, 126, 128, 130, 132, and 134 (FIG. 1), all of which include rules other than the language rules 122, results in the same rank of the pop singer communities 1 and 2.

In various implementations, a statistical amount of members of the coffee community 1 discuss, e.g., post, post comments, upload videos, upload images, upload multimedia, upload animations, upload audios, etc., in French within the coffee community 1 and a statistical amount of members of the coffee community 2 discuss in English within the coffee community 2. All other things being equal, the coffee community 1 is ranked as being more relevant than the coffee community 2 when the user 102's preferred language is French.

It should further be noted that in some implementations, instead of English or French, any other language, e.g., Chinese, Mandarin, Hindi, Telugu, Tamil, etc., may be used.

It should also be noted that instead of coffee, any other product, service, or emotion, e.g., hydrogen, aluminum, metals, leaves, trees, etc. may be illustrated.

Figure 3F:
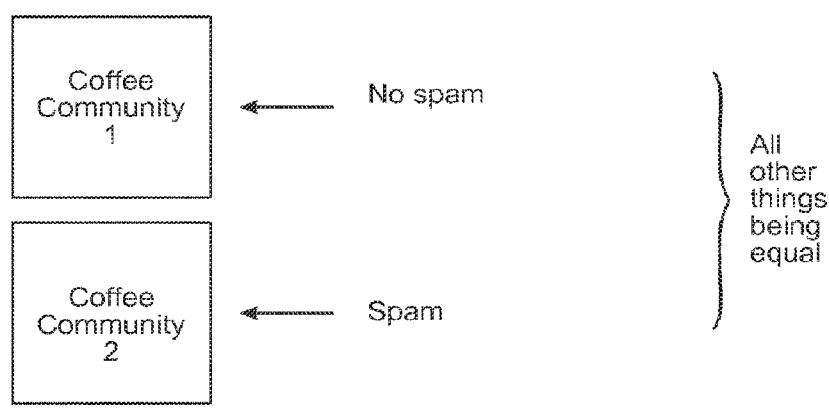
FIG. 3F is a diagram used to illustrate yet another application of abuse rules, in accordance with several implementations of the present disclosure.

FIG. 3F is a diagram used to illustrate an application of the abuse rules 126 (FIG. 1), in accordance with several implementations described in the present disclosure. The coffee community 1 lacks spam and the coffee community 2 includes spam. In various implementations, the coffee community 1 includes a lower amount of spam than that in the coffee community 2. All other things being equal, the coffee community 1 is ranked as being more relevant than the coffee community 2. It should be noted that in some implementations, as shown in FIG. 3F, all other things being equal means that application of the rules 114, 116, 118, 120, 122, 124, 128, 130, 132, and 134 (FIG. 1), all of which include rules other than the abuse rules 126, results in the same rank of the coffee communities 1 and 2.

Figure 3G:
FIG. 3G is a diagram used to illustrate an application of location rules for ranking the communities, in accordance with various implementations of the present disclosure.

FIG. 3G is a diagram used to illustrate an application of the location rules 122 (FIG. 1), in accordance with various implementations described in the present disclosure. A first statistical amount of members of the coffee community 1 are located in United Kingdom and a second statistical amount of members of the coffee community 2 are located in the United States. It should be noted that the first statistical amount may be the same or different than the second statistical amount. It should further be noted that the first user 102 is located in the United Kingdom. All other things being equal, the coffee community 1 is ranked as being more relevant than the coffee community 2. It should be noted that in various implementations, all other things are equal as shown in FIG. 3G means that application of the rules 114, 116, 118, 120, 124, 126, 128, 130, 132, and 134 (FIG. 1), all of which include rules other than the location rules 122, results in the same rank of the coffee communities 1 and 2.

It should further be noted that instead of United States or United Kingdom, any other geographic location, e.g., Union city, California, Ahmadabad, Vadodara, Peru, Brazil, Germany, France, Paris, etc., may be used. Examples of a geographic location include a city, a state, a country, a county, a landmark, a village, a town, an area of land, a latitude, a longitude, abroad, traveling, an expatriate location, a combination thereof, etc.

Figure 3H:
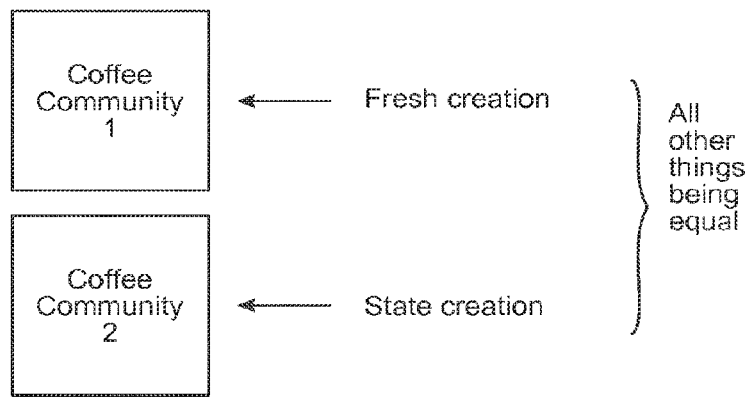
FIG. 3H is a diagram used to illustrate an application of freshness rules for ranking the communities, in accordance with several implementations of the present disclosure.

FIG. 3H is a diagram used to illustrate an application of the freshness rules 134 (FIG. 1), in accordance with several implementations described in the present disclosure. The coffee community 1 is created fresh and the coffee community 2 created has become stale. For example, the coffee community 1 is created on Nov. 15, 2012 and the coffee community 2 is created on Oct. 1, 2007. It should be noted that in some implementations, instead of Nov. 15, 2012, any other date may be used and instead of Oct. 1, 2007, any other date may be used. All other things being equal, the coffee community 1 is ranked as being more relevant than the coffee community 2. It should be noted that in some implementations, as shown in FIG. 3H, all other things being equal means that application of the rules 114, 116, 118, 120, 122, 124, 126, 128, 130, and 132 (FIG. 1), all of which include rules other than the freshness rules 134, results in the same rank of the coffee communities 1 and 2.

In several implementations, upon determining that the community 1 is created before the community 2, the community 2 may be ranked as being more relevant than the community 1 based on a topic of the communities 1 and 2. For example, upon determining that both communities 1 and 2 are associated with a topic 1, e.g., a book, a movie, etc., and upon determining that the community 1 is created before the community 2, the community 1 is ranked as being more relevant than the community 2. As another example, upon determining that both communities 1 and 2 are associated with a topic 2, e.g., an institution, a place, etc., and upon determining that the community 1 is created before the community 2, the community 2 is ranked as being more relevant than the community 1.

Figure 3I:
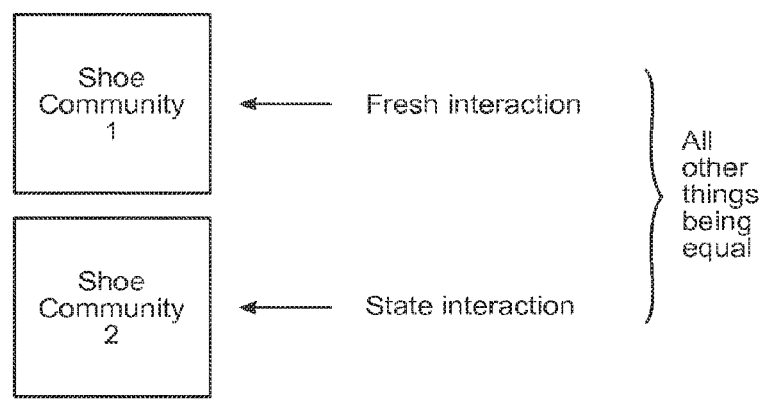
FIG. 3I is a diagram used to illustrate another application of the freshness rules, in accordance with various implementations of the present disclosure.

FIG. 3I is a diagram used to illustrate another application of the freshness rules 134 (FIG. 1). A member of a shoe community 1 has a fresh interaction with the shoe community 1 and a member of the shoe community 2 has a stale interaction with the shoe community 2. For example, the latest interaction of any member of the shoe community 1 with the shoe community 1 is on Nov. 2, 2012 and the latest interaction of any member of the shoe community 2 with the shoe community 2 is on Oct. 1, 2008. As another example, the latest post created by any member of the shoe community 1 is dated Nov. 2, 2012 within the shoe community 1 and the latest post created by any member of the shoe community 2 is dated Oct. 1, 2008. It should be noted that in some implementations, instead of Nov. 1, 2012, any other date may be used and instead of Oct. 1, 2008, any other date may be used. It should further be noted that the shoe communities 1 and 2 are results of application of the topic rules 114. In several implementations, the shoe communities 1 and 2 are generated simultaneous with or before applying the topic rules 114. All other things being equal, the shoe community 1 is ranked as being more relevant than the shoe community 2. It should be noted that in some implementations, as shown in FIG. 3O, all other things being equal means that application of the rules 114, 116, 118, 120, 122, 124, 126, 128, 130, and 132 (FIG. 1), all of which include rules other than the freshness rules 134, results in the same rank of the shoe communities 1 and 2.

It should also be noted that instead of shoes, any other product, service, or emotion, e.g., paper, stapler, desk, chair, etc. may be illustrated.

Figure 3J:
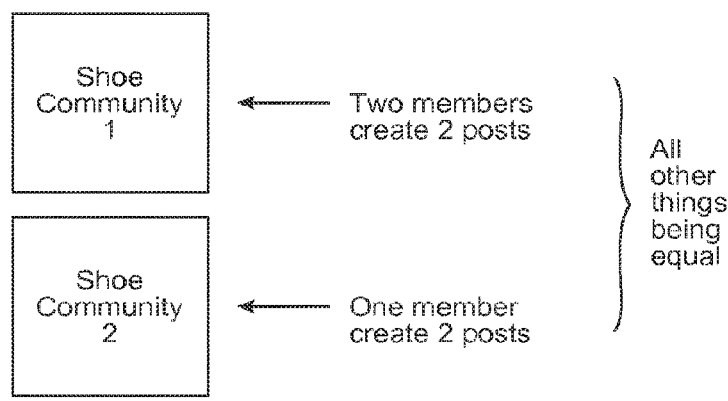
FIG. 3J is a diagram used to illustrate an application of ratio rules for ranking the communities, in accordance with several implementations of the present disclosure.

FIG. 3J is a diagram used to illustrate an application of the ratio rules 132 (FIG. 1). Two members create two posts within the shoe community 1 and one member creates two posts within the shoe community 2. It should be noted that instead of posts, a comment to a post, an upload, a combination of a post, a comment, and an upload, etc. may be created. It should further be noted that in various implementations, instead of two members, any other number of members may be used and instead of one member, any other number of members may be used. The number of members that create a number of posts within the shoe community 2 is less than the number of members that create the same number of posts within the shoe community 1. Moreover, in some implementations, instead of two posts, any other number of posts may be used. All other things being equal, the shoe community 1 is ranked as being more relevant than the shoe community 2. It should be noted that in some implementations, as shown in FIG. 3J, all other things being equal means that application of the rules 114, 116, 118, 120, 122, 124, 126, 128, 130, and 134 (FIG. 1), all of which include rules other than the ratio rules 132, results in the same rank of the shoe communities 1 and 2. In several implementations, the shoe community 2 is ranked as being more relevant than the shoe community 1

Figure 3K:
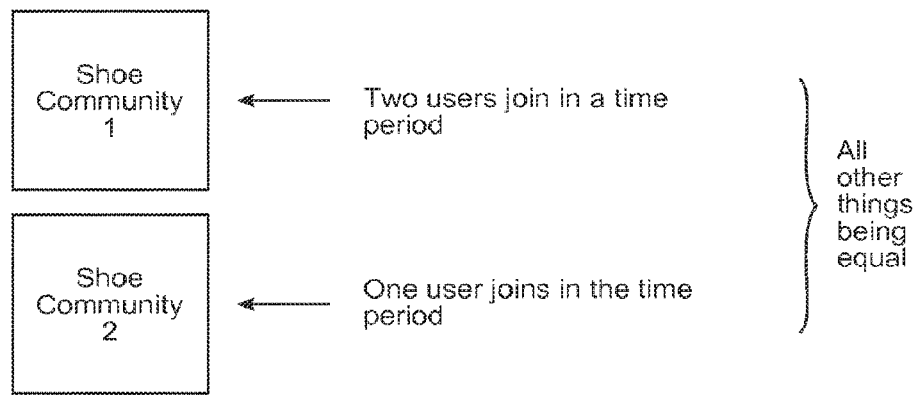
FIG. 3K is a diagram used to illustrate an application of join rate rules for ranking the communities, in accordance with various implementations of the present disclosure.

FIG. 3K is a diagram used to illustrate an application of the join rate rules 128 (FIG. 1). Two users join the shoe community 1 in a time period and one user joins the shoe community 2 in the time period. The time period illustrated using FIG. 3K is stored in one or more memory devices of the one or more servers. It should be noted that in some implementations, instead of one or two users, any other number of users may be used. For example, 15 users may join the shoe community 1 and five users may join the shoe community 2. All other things being equal, the shoe community 1 is ranked as being more relevant than the shoe community 2. It should be noted that in various implementations, as shown in FIG. 3K, all other things being equal means that application of the rules 114, 116, 118, 120, 122, 124, 126, 130, 132, and 134 (FIG. 1), all of which include rules other than the join rate rules 128, results in the same rank of the shoe communities 1 and 2.

Figure 3L:
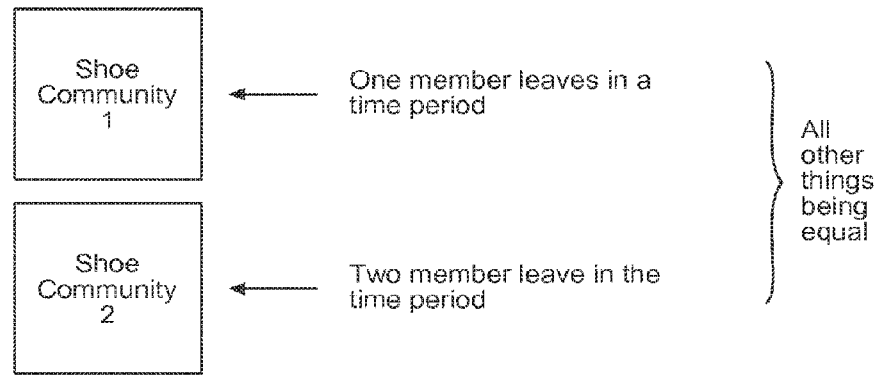
FIG. 3L is a diagram used to illustrate an application of bounce rate rules for ranking the communities, in accordance with several implementations of the present disclosure.

FIG. 3L is a diagram used to illustrate an application of the bounce rate rules 130 (FIG. 1). One member leaves the shoe community 1 in a time period and two members leave the shoe community 2 in the time period. The time period illustrated using FIG. 3L is stored in one or more memory devices of the one or more servers. It should be noted that in some implementations, instead of one or two members, any other number of members may be used. For example, three members may leave the shoe community 1 and 12 members may leave the shoe community 2. All other things being equal, the shoe community 1 is ranked as being more relevant than the shoe community 2. It should be noted that in various implementations, as shown in FIG. 3L, all other things being equal means that application of the rules 114, 116, 118, 120, 122, 124, 126, 128, 132, and 134 (FIG. 1), all of which include rules other than the bounce rate rules 130, results in the same rank of the shoe communities 1 and 2.

Figure 3M:
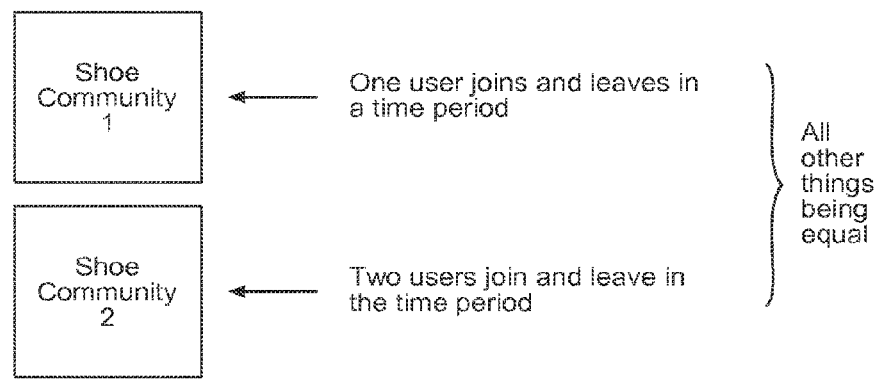
FIG. 3M is a diagram used to illustrate another application of the bounce rate rules, in accordance with various implementations of the present disclosure.

FIG. 3M is a diagram used to illustrate another application of the bounce rate rules 130 (FIG. 1). One user joins as well as leaves the shoe community 1 in a time period and two users join and leave the shoe community 2 in the time period. The time period illustrated using FIG. 3M is stored in one or more memory devices of the one or more servers. It should be noted that in some implementations, instead of one or two users, any other number of users may be used. For example, seven users may join and then leave the shoe community 1 and 20 members may leave the shoe community 2. All other things being equal, the shoe community 1 is ranked as being more relevant than the shoe community 2. It should be noted that in various implementations, as shown in FIG. 3M, all other things being equal means that application of the rules 114, 116, 118, 120, 122, 124, 126, 128, 132, and 134 (FIG. 1), all of which include rules other than the bounce rate rules 130, results in the same rank of the shoe communities 1 and 2.

Figure 3N:
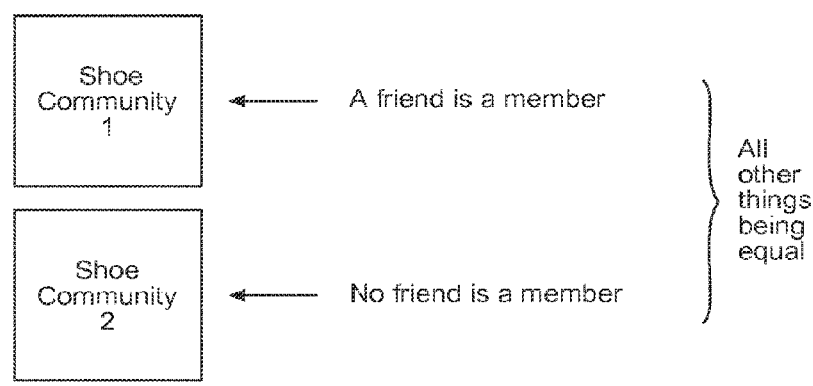
FIG. 3N is a diagram used to illustrate an application of association rules for ranking the communities, in accordance with several implementations of the present disclosure.

FIG. 3N is a diagram used to illustrate an application of the association rules 124 (FIG. 1). A social network friend of the user 102 (FIG. 1) is a member of the shoe community 1 and none of social network friends of the user 102 are members of the shoe community 2. All other things being equal, the shoe community 1 is ranked as being more relevant than the shoe community 2. It should be noted that in some implementations, as shown in FIG. 3N, all other things being equal means that application of the rules 114, 116, 118, 120, 122, 126, 128, 130, 132, and 134 (FIG. 1), all of which include rules other than the association rules 124, results in the same rank of the shoe communities 1 and 2.

Figure 4A:
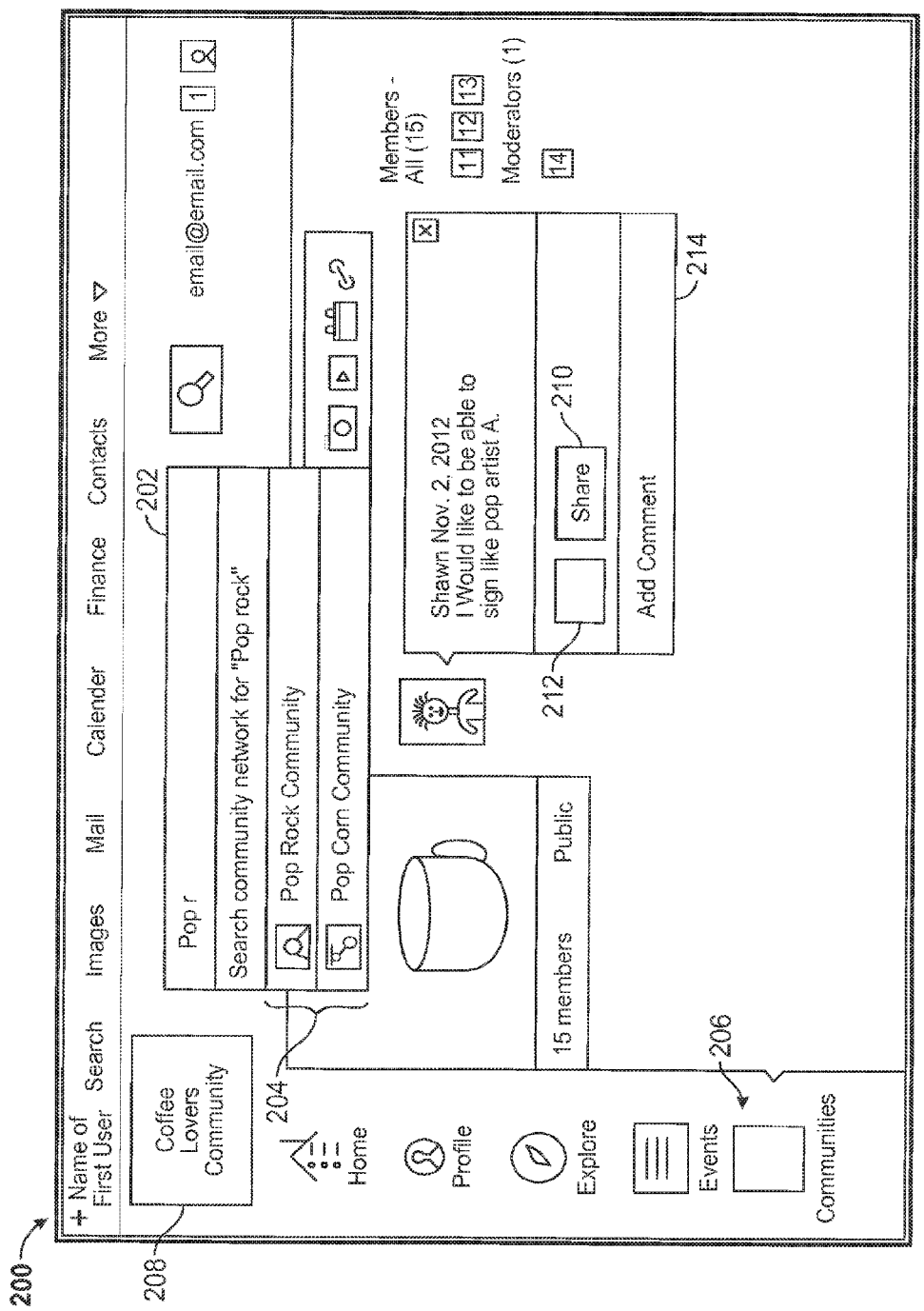
FIG. 4A is a diagram of a web page for illustrating ranking of communities according to an autocomplete feature, in accordance with various implementations of the present disclosure.

FIG. 4A is a diagram of a web page 200 for illustrating ranking of communities according to an autocomplete feature and application of one or more of the 112, 114, 116, 118, 120, 122, 124, 126, 128, 130, 132, and 134 (FIG. 1), in accordance with several implementations described in the present disclosure. The autocomplete feature is a portion of the search engine 220 (FIG. 1). The autocomplete feature is a feature of a computer program that predicts a word or phrase that a user wants to type in without typing the word or phrase completely. The word or phrase is predicted based on characters already typed in a search field. For example, when the user 102 types in search terms "pop r" in a search field 202 displayed on a display device of a client device, one or more processors of the one or more servers predicts that the user 102 intends to perform a search on a search term "pop rock".

The web page 200 is displayed on a display device of a client device by a GPU of the client device. When the user 102 enters a search query, e.g., "pop r", within the search field 202, the autocomplete feature and one or more of the rules 112, 114, 116, 118, 120, 122, 124, 126, 128, 130, 132, and 134 are applied by one or more processors of the one or more servers to generate ranked search results 204, e.g., "Pop Rock Community", "Popcorn community", etc. The search results 204 are displayed within a drop list.

The search results 204 are ranked to provide "Pop Rock Community" as listed first compared to the "Popcorn community". In various implementations, instead of or in addition to listing communities in an order to show ranks of the communities, a prefix, e.g., letters A, B, C, D, roman numerals I, II, numbers 1, 2, 3, etc. are provided to indicate the ranks. For example, the search results 204 would include "A. Pop Rock Community", "B. Popcorn community", etc. In some implementations, instead of or in addition to listing communities in an order to show ranks of the communities, community identifiers of the communities are displayed to distinguish between ranks of the communities. For example, an image representing the "Pop Rock Community" is larger than an image representing the "Popcorn Community" when the "Pop Rock Community" is ranked as being more relevant that the "Popcorn Community". As another example, an image representing the "Pop Rock Community" is displayed with a different color, texture, shade, etc. than an image representing the "Popcorn Community" when the "Pop Rock Community" is ranked as being more relevant that the "Popcorn Community". As yet another example, a different form of information representing the "Pop Rock Community" than a form of information representing the "Popcorn Community" when the "Pop Rock Community" is ranked as being more relevant that the "Popcorn Community". For example, a video of the "Pop Rock Community" is displayed and an image of the "Popcorn Community" is displayed.

It should be noted that in several implementations, the auto complete feature is executed simultaneous with the application of one or more of the rules 112, 114, 116, 118, 120, 122, 124, 126, 128, 130, 132, and 134 (FIG. 1). For example, the rule 114 is executed simultaneous with the autocomplete feature to generate the search results 204. A statistical amount of members of the "Pop Rock Community" converse about pop rock and the statistical amount is greater than a statistical amount of members of the "Popcorn community" that converse about pop rock.

It should be noted that the search results 204 are displayed on the web page 200 that is accessed via a social network account of a first user, e.g., the user 102 (FIG. 1). The first user provides user identifying information, e.g., a user name, a password, a telephone number, an email address, etc., to access the web page 200. When the user identifying information is authenticated by one or more processors of the one or more servers, the first user is provided access to the web page 200. The web page 200 includes a communities image 206, which is selected by the first user after being authenticated to access one or more communities of which the first user is a member.

The first user is a member of a coffee lovers community, which is represented by a name "Coffee Lovers Community" 208 and is represented by a coffee cup image 210. In some implementations, a community is represented by any form of information, e.g., a video, an animation, an image, an audio, text, a combination thereof, etc.

The web page 200 includes a list of various services that are provided by one or more users that also provide a service of creating, managing, and deleting communities. For example, the web page 200 includes a search service used to search the World Wide Web, a service used to search images on the World Wide Web, an electronic messaging service, a calendar service, a finance service, a contacts service, and more services.

It should be noted that services are not limited to the ones described herein. For example, various other services include a legal search service, a shopping service, a document creation and storage service, a music service, and books services.

The web page 200 includes a "Home" symbol. When the "Home" symbol is selected by the first user via an input device of a client device, a home social network page of the first user is accessed by one or more processors of the one or more servers to display on a client device operated by the first user. For example, when the "Home" symbol is selected, the client device operated by the first user displays posts created by and/or received by the user within a social network account of the user, comments made and/or received by the user within the social network account, uploads made by the user to the social network account and/or sent to the social network account by other users, representations of social network friends of the user, etc.

The web page 200 further includes a "Profile" symbol. When the "Profile" symbol is selected by the first user via an input device of a client device, all posts created by the first user within a social network account of the first user are displayed. Moreover, in various implementations, information identifying the first user, e.g., an image of the first user, a name of the first user, an email address of the first user, etc., is displayed when the "Profile" symbol is selected by the first user.

It is indicated on the web page 200 that the first user is a member of the coffee lovers community. Moreover, the web page 200 indicates that there is a total of 15 members of the coffee lovers community and that the coffee lovers community is public. When the coffee lovers community is public, any user having a social network account within the social network 138 can become a member of the coffee lovers community.

The web page 200 includes posts, comments, uploads, etc. received from members of the coffee lovers community. For example, a post that is posted by Shawn on Nov. 2, 2012 indicates, "I would like to be able to sing like pop artist A". The first user may select a button 210 to share the post with one or more social network friends of the first user, may select a button 212 to indicate likeness towards the post, and/or add a comment within a comment field 214 to comment on the post. The web page 200 also includes images i1, i2, i3, etc. of some members of the coffee lovers community and an image i4 of a moderator, e.g., an administrator, an owner, etc., of the coffee lovers community.

It should be noted that in some implementations, the search results 204 can be generated on a web page that is accessed by selecting any other symbol, e.g., the "Home" symbol, the "Profile" symbol, an "Explore" symbol, an "Events" symbol, etc. via an input device of a client device.

It should further be noted that in some implementations, more symbols than that shown on the web page 200 are included on the web page 200. For example, a symbol that allows a user to conduct a video chat with other users may be shown. As another example, a symbol that allows a user to play games with other users may be shown.

Figure 4B:
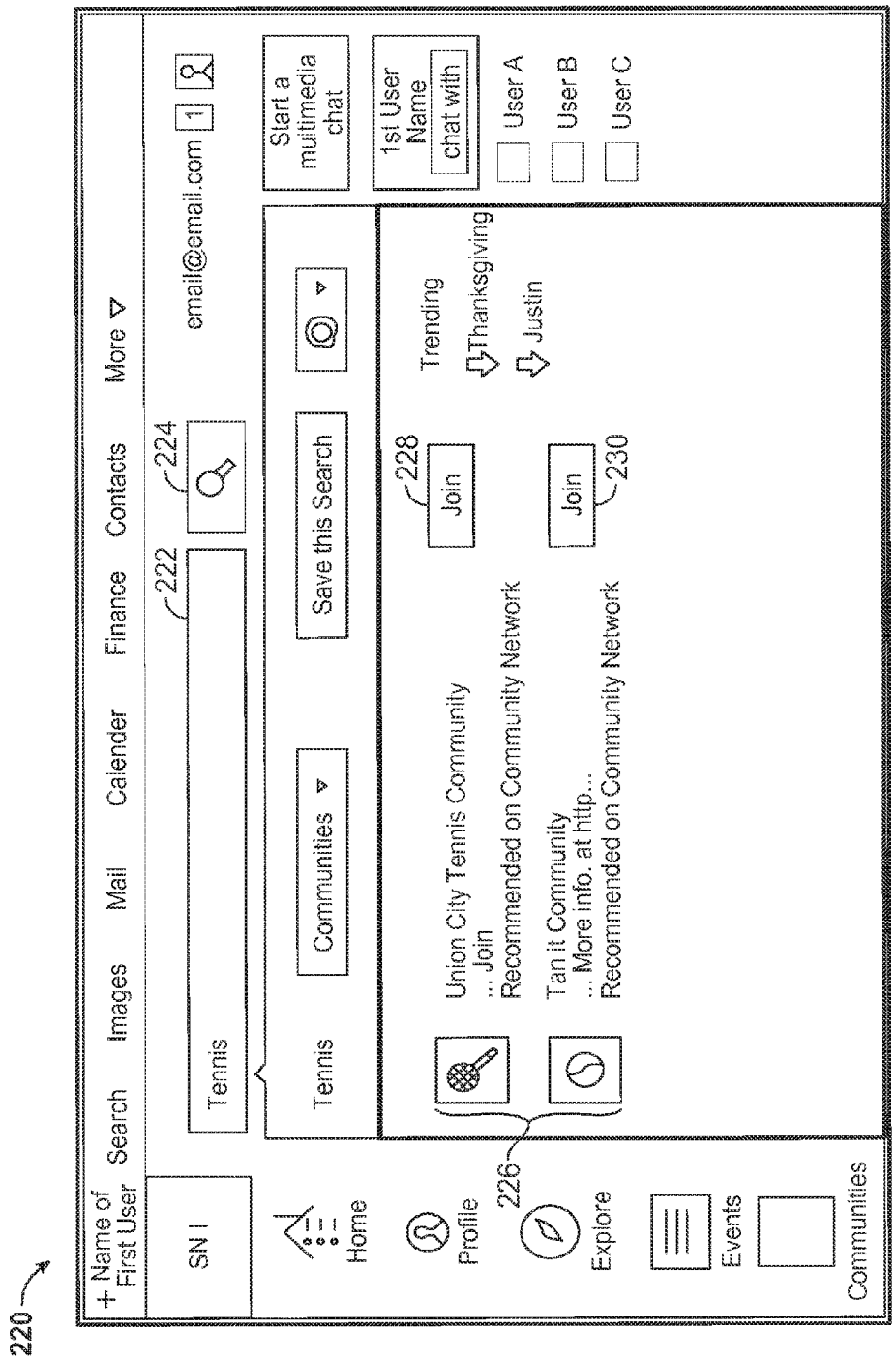
FIG. 4B is a diagram of a web page that illustrates search results of a search query, in accordance with several implementations of the present disclosure.

FIG. 4B is a diagram of a web page 220 that includes search results of a search query, in accordance with various implementations described in the present disclosure. The web page 220 is displayed on a display device of a client device by a GPU of the client device. The web page 220 includes a social network identifier (SNI) that identifies a social network that is accessed by the first user. Examples of the SNI include an image, a video, text, audio, multimedia, etc.

The first user enters a search query "Tennis" within a search field 222 and selects a search button 224. Upon receiving an indication of the selection of the search button 224, the search engine 110 (FIG. 1) is executed by one or more processors of the one or more servers to generate search results 226. The search results 226 are generated by applying one or more of the rules 112, 114, 116, 118, 120, 122, 124, 126, 128, 130, 132, and 134. For example, a "Union city Tennis Community" is ranked first and a "Tennis Community" is ranked second in the search results. In this example, a higher number of members of the "Union city Tennis Community" discuss about tennis that a number of members of the "Tennis Community".

As explained above, ranking of communities within the search results 226 may be indicated in a variety of ways. For example, an image representing the "Union city Tennis Community" is larger than an image representing the "Tennis Community".

In some implementations, a join button is displayed to join a community in the search results 226. For example, a user selects via an input device of a client device, a join button 228. Upon receiving an indication of the selection of the join button 228, one or more processors of the one or more servers facilitate a user to join "Union city Tennis Community". Similarly, a selection of a join button 230 allows a user to join the "Tennis Community". It should be noted that a user can access the search field 222 upon selecting the "Home" symbol, the "Profile" symbol, the "Explore" symbol, the "Events" symbol, the "Communities" symbol, etc.

It should further be noted that in some implementations, more symbols than that shown on the web page 220 are included on the web page 220. For example, a symbol that allows a user to play games with other users may be shown.

Figure 5:
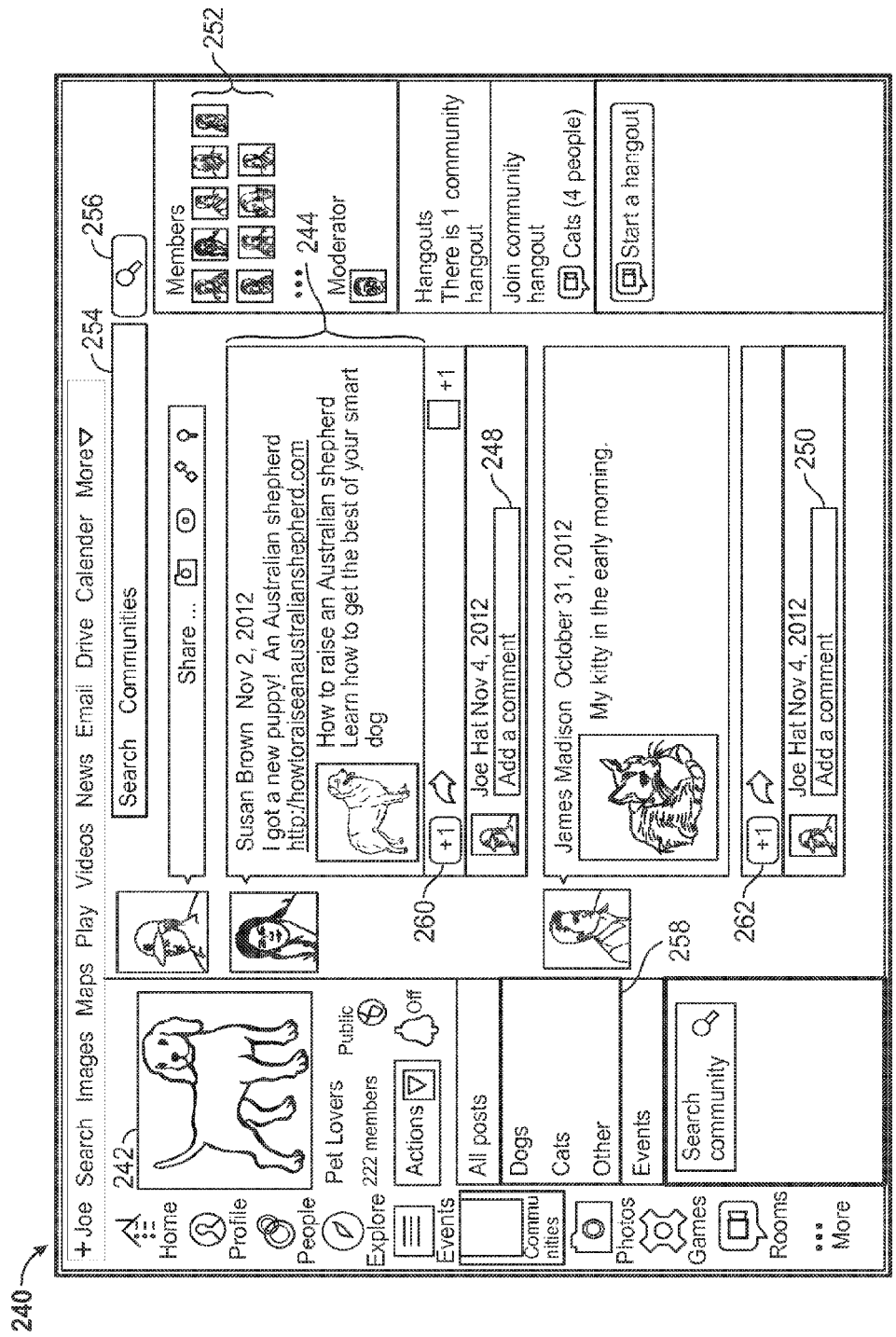
FIG. 5 is a diagram of a web page that illustrates a pet lovers community, in accordance with some implementations of the present disclosure.

FIG. 5 is a diagram of a web page 240 that illustrates a pet lovers community A user named "Joe" is a member of the pet lovers community. An image 242 of the pet lovers community is displayed on the web page 240. Also, a total number "222' of members is indicated on the web page 240. It is further indicated on the web page 240 that the pet lovers community is a public community.

Posts 244 and 246 from members of the pet lovers community are displayed on the web page 240. The post 244 that includes text, a hyperlink, and an image of an Australian shepherd dog is posted by a member named "Susan Brown". The post 246 that includes an image of a cat and text is posted by a member named "James Madison". A user may use his/her/its input device of a client device to comment on the post 244 via a comment field 248 and the user may use the input device to comment on the post 246 via a comment field 250.

The web page 240 includes images of some members of the pet lovers community. Moreover, the web page 240 includes a search field 254 for receiving a search query to search the social network 138 and a search button 256 that is selected to generate search results. For example, when the search button 256 is selected, one or more of the rules 112, 114, 116, 118, 120, 122, 124, 126, 128, 130, 132, and 134 are applied by one or more processors of the one or more servers to rank communities within search results.

A filter box 258 allows a user to filter posts within the pet lovers community based on whether the user wishes to view posts related to dogs, cats, or other pets. A button 260 may be selected by a user via an input device of a client device to indicate likeness towards the post 244 to other members of the pet lovers community. Similarly, a button 262 may be selected by a user via an input device of a client device to indicate likeness towards the post 246 to members of the pet lovers community.

It should be noted that in several implementations, the web page 240 may include information regarding any other community, e.g. a community regarding a product, a community regarding a service, a community regarding an emotion, etc.

Figure 6:
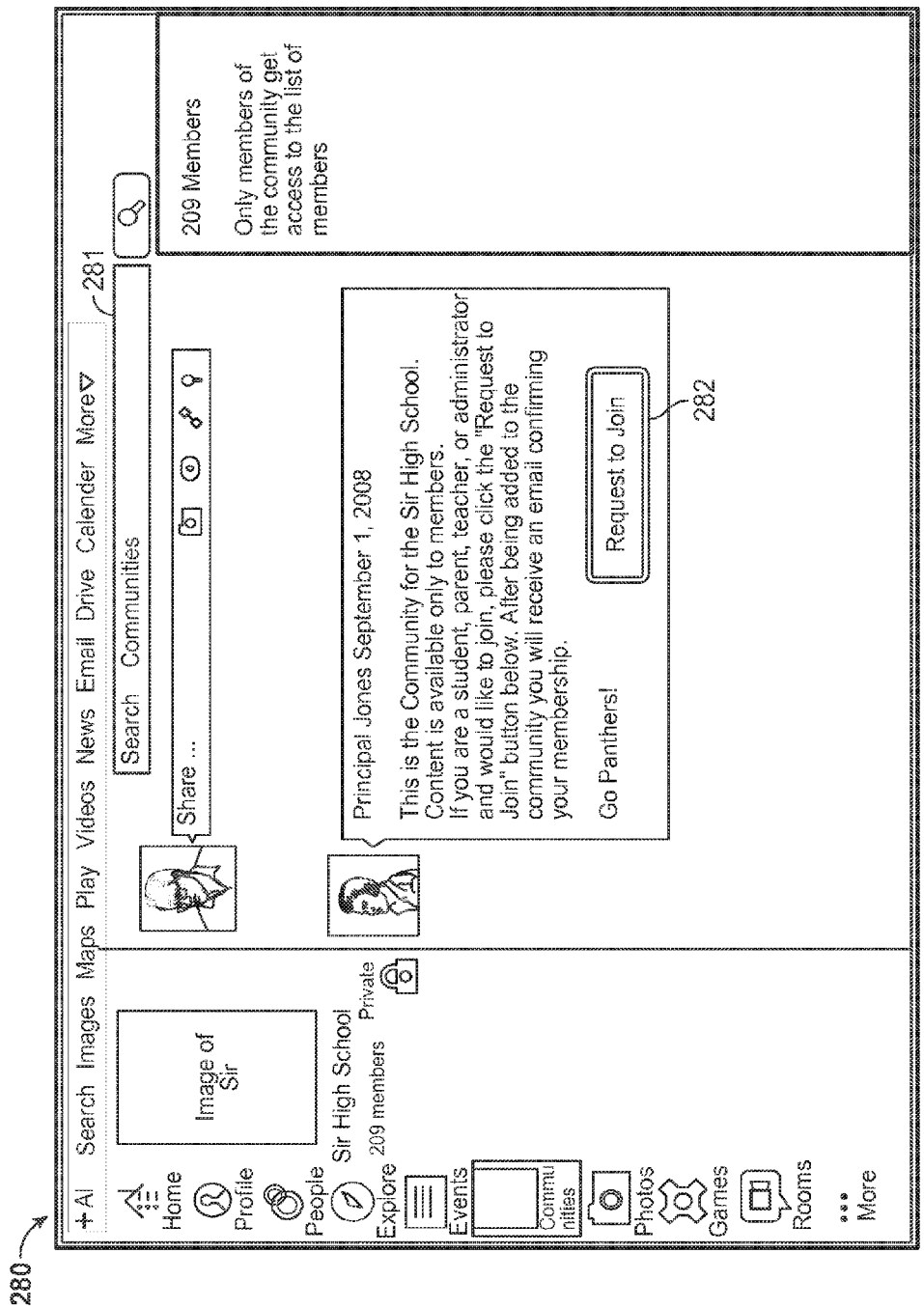
FIG. 6 is a diagram of a web page for joining a Sir high school community, in accordance with various implementations described in the present disclosure.

FIG. 6 is a diagram of a web page 280 for joining a Sir high school community, in accordance with various implementations described in the present disclosure. As indicated, the Sir high community is a private community. When a community is private, a user can join the community after obtaining permission from an owner or administrator of the community. The user can post to the private community, comment on posts within the private community, can upload information to the private community after joining the private community. The Sir high school community may be a community ranked in search results generated in response to a search query. When a user selects a join button associated with the Sir high school community within the search results, one or more processors of the one or more servers provide data to display the web page 280 on a display device of a client device A user selects a request to join button 282. Upon receiving an indication of the selection of the request to join button 282, one or more processors of the one or more servers send the request to an administrator or owner of the Sir high school community. Once permission is received from the owner or administrator of the Sir high school community, one or more processors of the one or more servers allow a user that selected the request to join button 282 to join the Sir high school community.

When a search query is received within a search field 281, one or more processors of the one or more servers apply one or more of the rules 112, 114, 116, 118, 120, 122, 124, 126, 128, 130, 132, and 134 to rank communities within search results.

It should be noted that in several implementations, when a private community is ranked within search results, posts, comments, uploads, etc. from the community are controlled by one or more processors of the one or more servers to be hidden from view on a display device.

Figure 7:
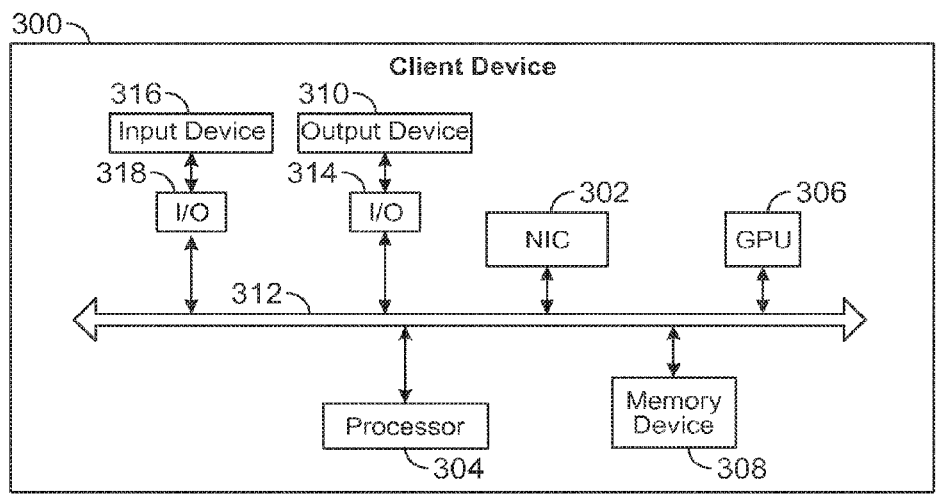
FIG. 7 is a block diagram of a client device of the system of FIG. 1, in accordance with several implementations of the present disclosure.

FIG. 7 is a block diagram of a client device 300, which is an example of the client device 104 and any other client devices referred to herein in the present disclosure, in accordance with several implementations of the present disclosure. The client device 300 includes a NIC 302, a processor 304, a GPU 306, a memory device 308, an output device 310, and an input device 312. Examples of the NIC 302 include a network interface card and a network adapter. The NIC 302 communicates with the one or more servers via the network 108 (FIG. 1).

Examples of the output device 310 include a liquid crystal display (LCD) device, a light emitting diode (LED) display device, a cathode ray tube (CRT) display device, and a plasma display device. The output device 310 includes a display screen and is coupled with a bus 312 via an input/output interface (I/O) 314.

An input device 316 is coupled with the bus 312 via an I/O 318. Examples of the input device 316 include a mouse, a keyboard, a keypad, a stylus, a touchscreen, etc.

An I/O provides compatibility between the bus 312 and a device that are coupled with the I/O. For example, the I/O 314 converts a rate of transfer of data on bus 312 to a rate of transfer of data of output device 310. As another example, an I/O converts a protocol used by one device coupled with the I/O to a protocol that is used by the bus 312 that is coupled with the I/O.

In some implementations, the input device 316 is integrated within the output device 310. For example, in such implementations, the input device 316 is a touch screen.

It should be noted that in other implementations, the client device 300 includes any number of processors, memory devices, input devices, display devices, caches, NICs and GPUs. Moreover, in some implementations, all functions that are performed by the GPU 306 are performed by the processor 304.

Figure 8:
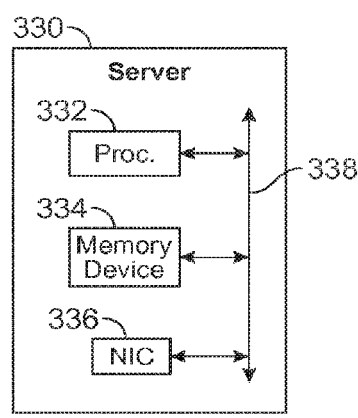
FIG. 8 is a block diagram of a server of the system of FIG. 1, in accordance with several implementations of the present disclosure.

FIG. 8 is a block diagram of a server 330, that is an example of any of the servers mentioned in the present disclosure, in accordance with various implementations described in the present disclosure. The server 330 includes a processor 332, a memory device 334, and a NIC 336, which are coupled with each other via a bus 338. The processor 332 communicates with one or more of the client devices, e.g., the client device 104 (FIG. 1), via the NIC 336 and the network 108 (FIG. 1). In some implementations, the processor 332 performs one or more operations described herein as being performed by one or more processors of the one or more servers.

It should be noted that in other implementations, the server 330 includes any number of processors, memory devices, NICs and GPUs.

It should be noted that although some implementations, described herein, relate to ranking communities in response to the search query 106 (FIG. 1), in several implementations, one or more of the rules 112, rules 114, rules 116, rules 118, rules 120, rules 122, rules 124, rules 126, rules 128, rules 130, rules 132, rules 134, and the invitation rules are applied independent of whether the search query 106 is received by one or more processors of the one or more servers, and the ranking may be used to generate community lists.

Implementations described in the present disclosure may be fabricated as computer-readable code on a non-transitory computer-readable storage medium, which is a storage device or a memory device. The non-transitory computer-readable storage medium holds data which may be read by a computer system. Examples of the non-transitory computer-readable storage medium include network attached storage (NAS), a memory device, a ROM, a RAM, a combination of RAM and ROM, a Compact Disc (CD), a Blu-Ray™ disc, a flash memory, a hard disk, and a magnetic tape. The non-transitory computer-readable storage medium may be distributed over a network-coupled computer system so that the computer-readable code is stored and executed in a distributed fashion.

Although the method operations were described in a specific order in the flowchart of FIG. 2, it should be understood that some operations may be performed in a different order, when the order of the operations do not affect the expected results. In addition, other operations may be included in the methods presented, and the operations may be performed by different entities in a distributed fashion, as long as the processing of the operations is performed in a desired way.

In addition, at least one operation of some methods performs physical manipulation of physical quantities, and some of the operations described herein are useful machine operations. Implementations presented herein recite a device or apparatus. The apparatus is specially constructed for a purpose. The apparatus includes a processor capable of executing the program instructions of the computer programs presented herein.

Although the foregoing implementations have been described with a certain level of detail for purposes of clarity, it is noted that certain changes and modifications may be practiced within the scope of the appended claims. Accordingly, the provided implementations are to be considered illustrative and not restrictive, not limited by the details presented herein, and may be modified within the scope and equivalents of the appended claims.

The invention claimed is:

1. A method comprising:
receiving, by a processor, a search query, the search query received from a user device of a first user of a social network; analyzing, by the processor, content within groups of the social network, wherein each group is associated with at least one of one or more owners or one or more administrators;
identifying, based on analyzed content within the groups, one or more of the groups that have content related to the search query, wherein each group includes one or more posts received from one or more members of a respective group, and wherein identifying the one or more groups comprises:
examining at least one of the one or more posts or metadata associated with the at least one of the one or more posts, and
identifying a respective group with a majority or total amount of members that have posted content matching the search query in the respective group;
and ranking, by the processor, the identified groups for presentation of the identified groups in a ranked order on the user device of the first user in response to the search query, the ranked order of each group being based on a corresponding majority or total amount of members that have posted content matching the search query, and wherein ranking of the identified group is based at least on a weighted combination of two or more of:
a match between languages used within the groups by members of the groups and a preference language of the first user,
the languages used to express the content,
an amount of spam within the groups, numbers of members joining and leaving the groups within a time period,
or ratios of numbers of posts made within the groups by members of the groups and numbers of the members.

2. The method of claim 1, wherein ranking of the identified groups is based on topics discussed in threads within the groups, the threads including the content.

3. The method of claim 1, wherein ranking of the identified groups is based on a number of shares of posts within the groups, the posts including the content.

4. The method of claim 1, wherein ranking of the identified groups is based on interactions of members with the groups.

5. The method of claim 1, wherein ranking of the identified groups is based on a number of social network friends of the first user within the groups.

6. The method of claim 1, wherein ranking of the identified groups is based on a location of the first user and locations of the groups.

7. The method of claim 1, wherein ranking of the identified groups is based on numbers of members joining the groups within a time period.

8. The method of claim 1, wherein ranking of the identified groups is based on numbers of members leaving the groups within a time period.

9. The method of claim 1, wherein ranking of the identified groups is based on dates of creation of the groups.

10. The method of claim 1, wherein ranking of the identified groups is based on dates of interactions of members of the groups with the groups.

11. The method of claim 1, wherein ranking of the identified groups is further based on a weighted combination of two or more of:
the content occurring within the groups;
a number of shares of posts within the groups; interactions of members with the groups; a number of social network friends of the first user within the groups;
a match between a location of the first user and locations of the groups;
numbers of members joining the groups within a time period; numbers of members leaving the groups within the time period;
dates of creation of the groups; or dates of interactions of members of the groups with the groups.

12. A system comprising:
a memory to store user accounts associated with a first user of a social network and members of groups; and a processor, coupled to the memory, the processor to:
receive a search query, the search query received from a user device of a first user of a social network;
analyze content within groups of the social network, wherein each group is associated with at least one of one or more owners or one or more administrators;
identify, based on analyzed content within the groups, one or more of the groups that have content related to the search query, wherein each group includes one or more posts received from one or more members of a respective group, and wherein identifying the one or more groups comprises:
examining at least one of the one or more posts or metadata associated with the at least one of the one or more posts, and
identifying a respective group with a majority or total amount of members that have posted content matching the search query in the respective group;
and rank the identified groups for presentation of the identified groups in a ranked order on the user device of the first user in response to the search query, the ranked order of each group being based on a corresponding majority or total amount of members that have posted content matching the search query, and wherein ranking of the identified group is based at least on a weighted combination of two or more of:
- a match between languages used within the groups by members of the groups and a preference language of the first user,
- the languages used to express the content, an amount of spam within the groups,
- numbers of members joining and leaving the groups within a time period, or ratios of numbers of posts made within the groups by members of the groups and numbers of the members.

13. A non-transitory computer-readable medium storing instructions, which when executed by a processor, cause the processor to:
receive a search query, the search query received from a user device of a first user of a social network; analyze content within groups of the social network, wherein each group is associated with at least one of one or more owners or one or more administrators;
identify, based on analyzed content within the groups, one or more of the groups that have content related to the search query, wherein each group includes one or more posts received from one or more members of a respective group, and wherein identifying the one or more groups comprises:
examining at least one of the one or more posts or metadata associated with the at least one of the one or more posts, and
identifying a respective group with a majority or total amount of members that have posted content matching the search query in the respective group;
and rank the identified groups for presentation of the identified groups in a ranked order on the user device of the first user in response to the search query, the ranked order of each group being based on a corresponding majority or total amount of members that have posted content matching the search query, and wherein ranking of the identified group is based at least on a weighted combination of two or more of:
- a match between languages used within the groups by members of the groups and a preference language of the first user,
- the languages used to express the content,
- an amount of spam within the groups, numbers of members joining and leaving the groups within a time period,
- or ratios of numbers of posts made within the groups by members of the groups and numbers of the members.

14. The non-transitory computer-readable medium of claim 13, wherein each group has one or more owners and one or more administrators.

* * * * *